(12) United States Patent
Sakai

(10) Patent No.: US 9,495,120 B2
(45) Date of Patent: Nov. 15, 2016

(54) PRINT SYSTEM, USABILITY INFORMATION GENERATION DEVICE, USABILITY INFORMATION GENERATION METHOD, NON-TRANSITORY COMPUTER-READABLE RECORDING MEDIUM ENCODED WITH USABILITY INFORMATION GENERATION PROGRAM

(71) Applicant: KONICA MINOLTA, INC., Chiyoda-ku (JP)

(72) Inventor: Hiroshi Sakai, Sakai (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/277,204

(22) Filed: May 14, 2014

(65) Prior Publication Data

US 2014/0355050 A1 Dec. 4, 2014

(30) Foreign Application Priority Data

May 29, 2013 (JP) .................................. 2013-112854

(51) Int. Cl.
*G06K 15/00* (2006.01)
*G06F 3/12* (2006.01)

(52) U.S. Cl.
CPC ............. *G06F 3/1204* (2013.01); *G06F 3/126* (2013.01); *G06F 3/1229* (2013.01); *G06F 3/1292* (2013.01)

(58) Field of Classification Search
None
See application file for complete search history.

(56) References Cited

U.S. PATENT DOCUMENTS

2010/0007910 A1* 1/2010 Martin et al. ................ 358/1.15
2011/0216349 A1* 9/2011 McCorkindale et al. ... 358/1.15
(Continued)

FOREIGN PATENT DOCUMENTS

JP H07-200215 A 8/1995
JP H11-157174 A 6/1999
(Continued)

OTHER PUBLICATIONS

Office Action (Notice of Ground of Rejection) mailed on May 26, 2015 by the Japanese Patent Office in corresponding Japanese Patent Application No. 2013-112854, and an English Translation of the Office Action. (8 pages).

*Primary Examiner* — John Wallace
(74) *Attorney, Agent, or Firm* — Buchanan Ingersoll & Rooney PC

(57) ABSTRACT

An information processing apparatus transmits a print job to a server and generates print status information including user identification information and a print condition included in the print job. Each of one or more image forming apparatuses transmits a transmission request, forms an image based on the print job, and generates device information including state information indicating its operating state. The server transmits a print job that includes the same user identification information as the user identification information included in the transmission request, to the image forming apparatus that has transmitted the transmission request. One of the server, the one or more image forming apparatuses, and the portable information device generates usability information indicating usability in a case where the print job is executed in each image forming apparatus, based on the device information and the print status information. The portable information device outputs the generated usability information.

18 Claims, 19 Drawing Sheets

(56) References Cited

U.S. PATENT DOCUMENTS

2012/0218600 A1* 8/2012 Shaw et al. .................. 358/1.15
2012/0250059 A1 10/2012 Itogawa et al.
2012/0293841 A1* 11/2012 Dolan et al. .................. 358/1.15

FOREIGN PATENT DOCUMENTS

| JP | 2000-122828 A | 4/2000 |
| JP | 2012-212330 A | 11/2012 |
| JP | 2012-248150 A | 12/2012 |
| JP | 2013-041554 A | 2/2013 |

* cited by examiner

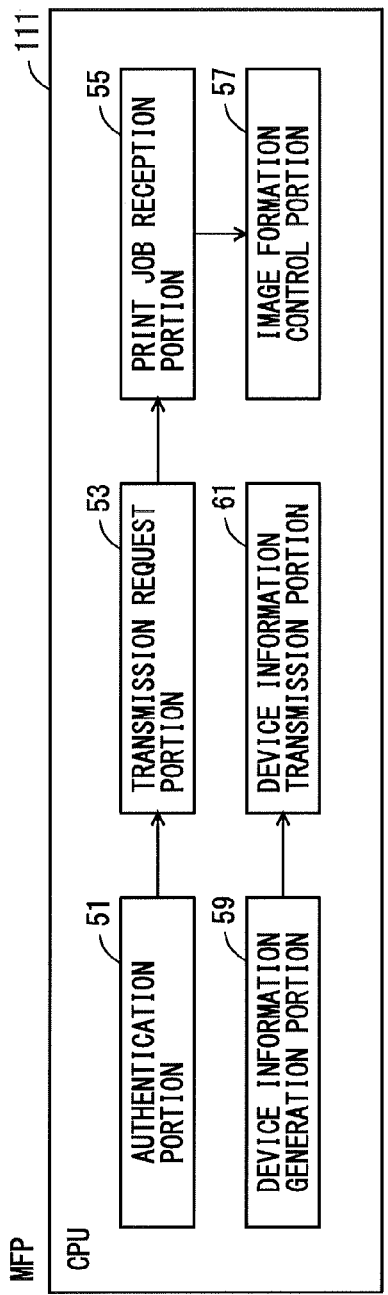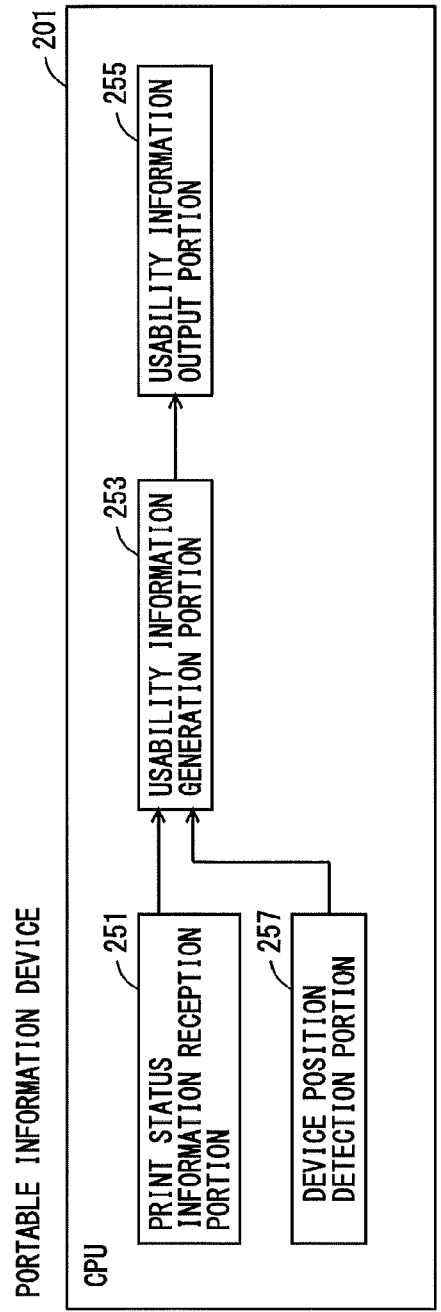

FIG. 16

- AUTHENTICATE WITH MFPA 1 M AHEAD AND PRINTING WILL BE COMPLETED AFTER 10 MINUTES.

- THREE MFPs 10 M AHEAD ARE READY FOR PRINTING. MFPB WILL RUN OUT OF PAPER AFTER 50 SHEETS. PREPARE A REFILL.

- FIVE MFPs ARE AVAILABLE 50 M AHEAD.

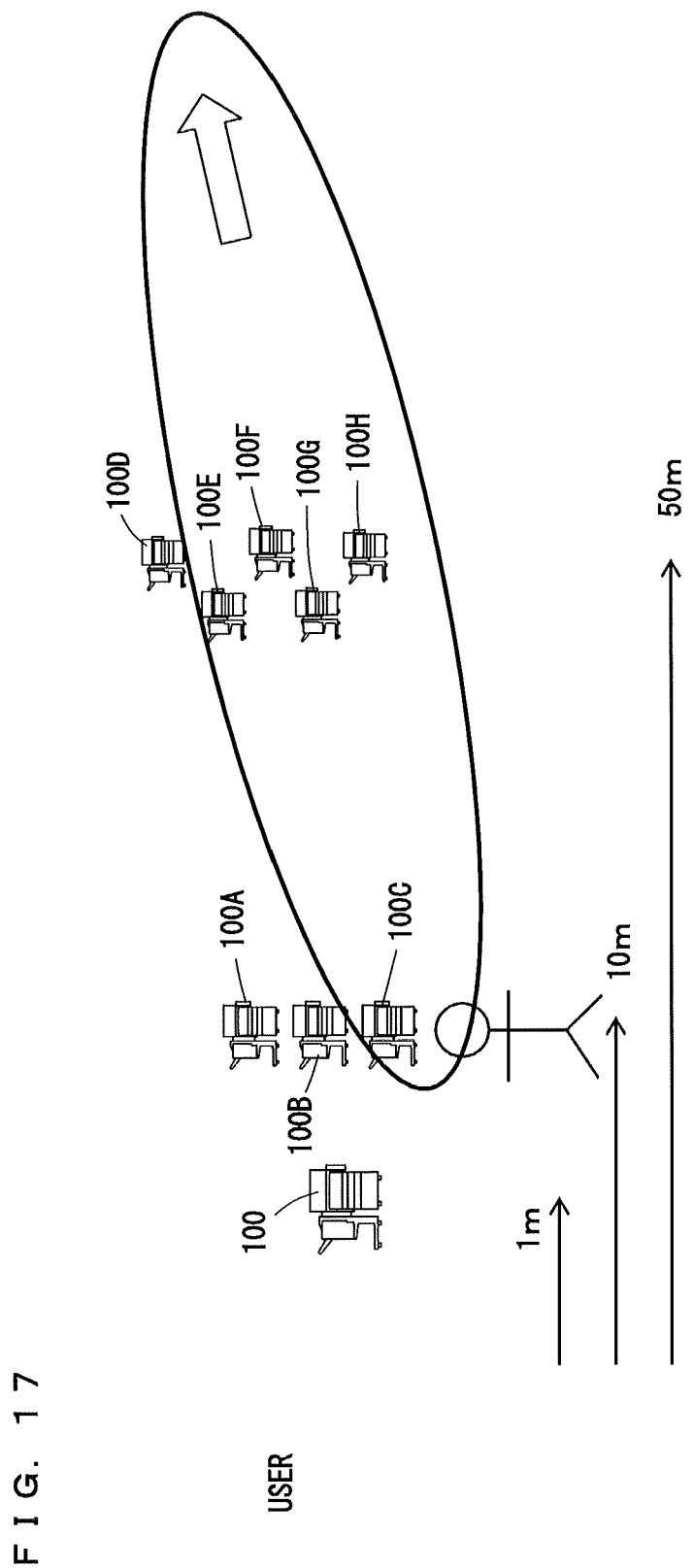

F I G. 1 8

- MFPB 1 M AHEAD TAKES 5 MINUTES TO COMPLETE PRINT JOB. PAPER WILL RUN OUT AFTER 50 SHEETS. PREPARE A REFILL.

- FOUR MFPs ARE AVAILABLE 40 M AHEAD.

FIG. 20
· THREE MFPs ARE AVAILABLE 20 M AHEAD.
FIG. 21
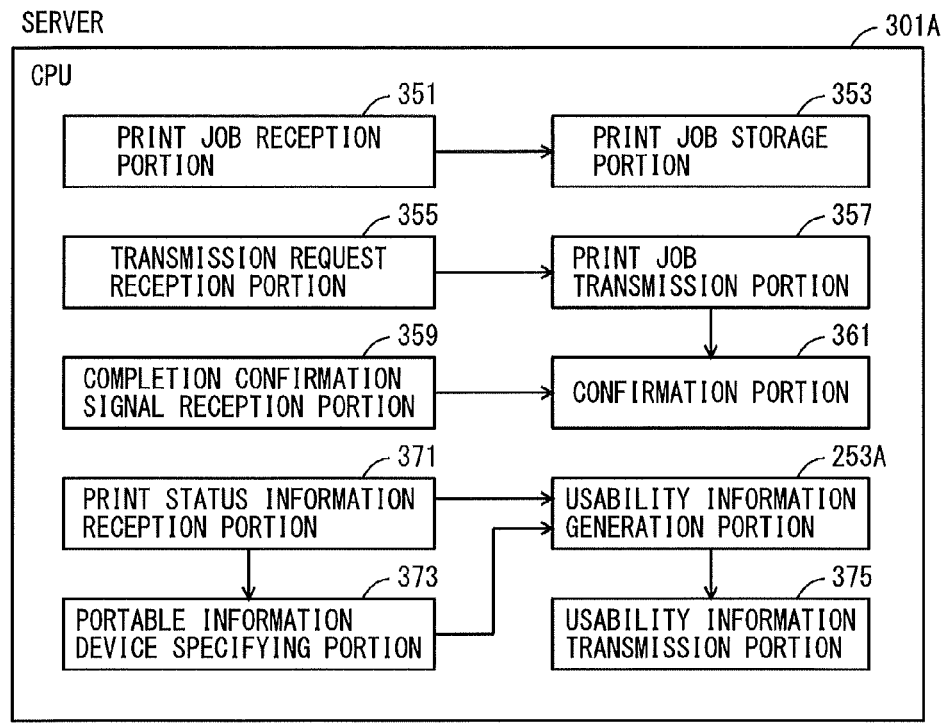
FIG. 22
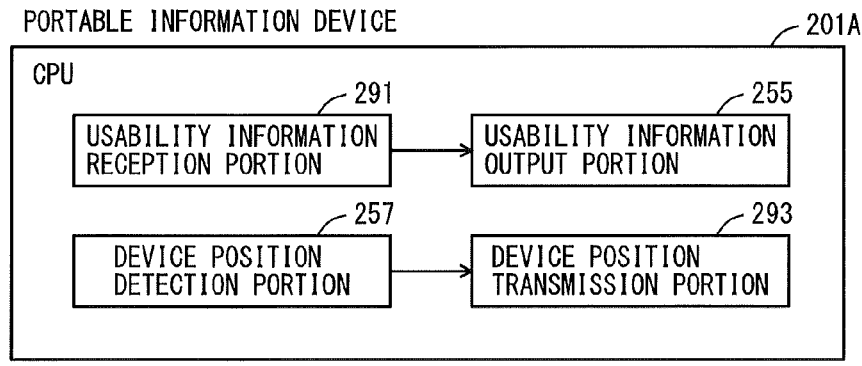

PRINT SYSTEM, USABILITY INFORMATION GENERATION DEVICE, USABILITY INFORMATION GENERATION METHOD, NON-TRANSITORY COMPUTER-READABLE RECORDING MEDIUM ENCODED WITH USABILITY INFORMATION GENERATION PROGRAM

This application is based on Japanese Patent Application No. 2013-112854 filed with Japan Patent Office on May 29, 2013, the entire content of which is hereby incorporated by reference.

BACKGROUND OF THE INVENTION

1. Field of the Invention

The present invention relates to a print system, a usability information generation device, a usability information generation method, and a non-transitory computer-readable recording medium encoded with a usability information generation program. More specifically, the present invention relates to a print system in which an image for print data accumulated in a server is formed in an image forming apparatus designated by a user, a usability information generation device for use in the print system, a usability information generation method performed in the usability information generation device, and a non-transitory computer-readable recording medium encoded with a usability information generation program.

2. Description of the Related Art

In recent years, a plurality of image forming apparatuses, typically such as Multi-Functional Peripherals, are often installed in office and other environments. A pull printing system is known in which a user can select any one of the plurality of image forming apparatuses and use the selected apparatus. In the pull printing system, print data transmitted from a personal computer (hereinafter referred to as "PC") is stored in a print server, and when the user logs in to an image forming apparatus, the image forming apparatus downloads the print data from the server and prints the data.

However, some of the image forming apparatuses may not be immediately available. Not being immediately available means, for example, a state in which the image forming apparatus is being used by another user or a state in which paper runs out and a paper refill is needed. In order to check the state of the image forming apparatus, the user has to go to the place where the image forming apparatus is actually installed.

Meanwhile, portable information devices such as smartphones and tablet terminals are being widespread, and a technique is known in which users use a portable information device to remotely operate an image forming apparatus. For example, Japanese Patent Laid-Open No. 2012-212330 describes an image recording system including an image recording device for recording an image on a recording medium and a portable terminal capable of operating the image recording device by radio communication and having a display. The image recording system includes distance detection means for detecting a distance from the portable terminal to the image recording device to be operated by the portable terminal, storage means for storing a plurality of operation screens for the image recording device corresponding to a plurality of ranges of the distance that are determined so as to be continuous, and display control means for allowing the display of the portable terminal to display the operation screen corresponding to the distance detected by the distance detection means. According to this technique, a single portable terminal can remotely operate a single image forming apparatus to allow the user to check the state of the image forming apparatus from a remote site.

However, a single portable terminal cannot remotely operate a plurality of image forming apparatuses simultaneously, so that the portable terminal has to be connected to a plurality of image forming apparatuses one by one in order to check the respective states of the image forming apparatuses. Accordingly, it is impossible to efficiently select one of the image forming apparatuses that is to be used by the user.

SUMMARY OF THE INVENTION

According to an aspect of the present invention, a print system includes a server, an information processing apparatus, one or more image forming apparatuses, and a portable information device. The information processing apparatus includes an operating user determination portion to determine an operating user, a print job transmission portion to transmit a print job including user identification information for identifying the operating user, print data to be subjected to image formation, and a condition for forming an image of the print data, to the server in response to an instruction by the operating user, and a print status information generation portion to generate print status information including the user identification information and the print condition included in the print job, in response to transmission of the print job. Each of the one or more image forming apparatuses includes an authentication portion to authenticate a user, a transmission request portion to, in response to a user being authenticated by the authentication portion, transmit a transmission request including user identification information for identifying the authenticated user, to the server, an image formation control portion to form an image of print data included in a print job received from the server, based on the print job, in response to transmission of the transmission request, and a device information generation portion to generate device information including state information indicating an operating state of the image forming apparatus itself. The server includes a print job storage portion to store the print job in response to the print job being received, and a print job transmission portion to, in response to a transmission request being received from any one of the image forming apparatuses, transmit a print job to the image forming apparatus that has transmitted the transmission request among the one or more image forming apparatuses, if a print job that includes the same user identification information as the user identification information included in the transmission request is stored. A usability information generation device that is one of the server, the one or more image forming apparatuses, and the portable information device includes a usability information generation portion to generate usability information indicating usability in a case where the print job is executed in each of the one or more image forming apparatuses, based on the device information generated by each of the one or more image forming apparatuses and the print status information generated by the information processing apparatus. The portable information device includes a usability information output portion to output the generated usability information.

According to another aspect of the present invention, a usability information generation device is for use in a print system in which a print job generated by an information processing apparatus is temporarily stored into a server and, in response to a user designating one of one or more image forming apparatuses, the designated image forming apparatus forms an image by downloading the print job from the server. The usability information generation device includes a print status information acquisition portion to acquire print status information including user identification information and a print condition included in the print job from the information processing apparatus; a device information acquisition portion to acquire, from each of the one or more image forming apparatuses, device information including state information indicating an operating state of the image forming apparatus itself; and a usability information generation portion to generate usability information indicating usability in a case where the print job is executed in each of the one or more image forming apparatuses, based on the device information acquired from each of the one or more image forming apparatuses and the print status information acquired from the information processing apparatus.

In accordance with a further aspect of the present invention, a usability information generation method is performed in a usability information generation device for use in a print system in which a print job generated by an information processing apparatus is temporarily stored into a server and, in response to a user designating one of one or more image forming apparatuses, the designated image forming apparatus forms an image by downloading the print job from the server. The method includes: a print status information acquisition step of acquiring print status information including user identification information and a print condition included in the print job from the information processing apparatus; a device information acquisition step of acquiring, from each of the one or more image forming apparatuses, device information including state information indicating an operating state of the image forming apparatus itself; and a usability information generation step of generating usability information indicating usability in a case where the print job is executed in each of the one or more image forming apparatuses, based on the device information acquired from each of the one or more image forming apparatuses and the print status information acquired from the information processing apparatus.

In accordance with yet another aspect of the present invention, a non-transitory computer-readable recording medium is encoded with a usability information generation program performed by a computer controlling a usability information generation device for use in a print system in which a print job generated by an information processing apparatus is temporarily stored into a server and, in response to a user designating one of one or more image forming apparatuses, the designated image forming apparatus forms an image by downloading the print job from the server. The program causes the computer to perform processing comprising: a print status information acquisition step of acquiring print status information including user identification information and a print condition included in the print job from the information processing apparatus; a device information acquisition step of acquiring, from each of the one or more image forming apparatuses, device information including state information indicating an operating state of the image forming apparatus itself; and a usability information generation step of generating usability information indicating usability in a case where the print job is executed in each of the one or more image forming apparatuses, based on the device information acquired from each of the one or more image forming apparatuses and the print status information acquired from the information processing apparatus.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 9 is a block diagram showing an overview of functions of the CPU of the MFP in the present embodiment.

FIG. 10 is a block diagram showing an overview of functions of the CPU of the portable information device in the present embodiment.

FIG. 16 is a diagram showing an example of usability information at the first time.

FIG. 17 is a diagram showing an example of the positional relationship between candidate devices and a user at a second time.

FIG. 18 is a diagram showing an example of usability information at the second time.

FIG. 20 is a diagram showing an example of usability information at the third time.

FIG. 21 is a block diagram showing an example of functions of the CPU of the server in a first modification.

FIG. 22 is a block diagram showing an example of functions of the CPU of the portable information device in the first modification.

DESCRIPTION OF THE PREFERRED EMBODIMENTS

Embodiments of the present invention will be described below with reference to the drawings. In the following description, the same parts are denoted with the same reference signs. Their names and functions are also the same. A detailed description thereof will not be repeated.

Figure 1:
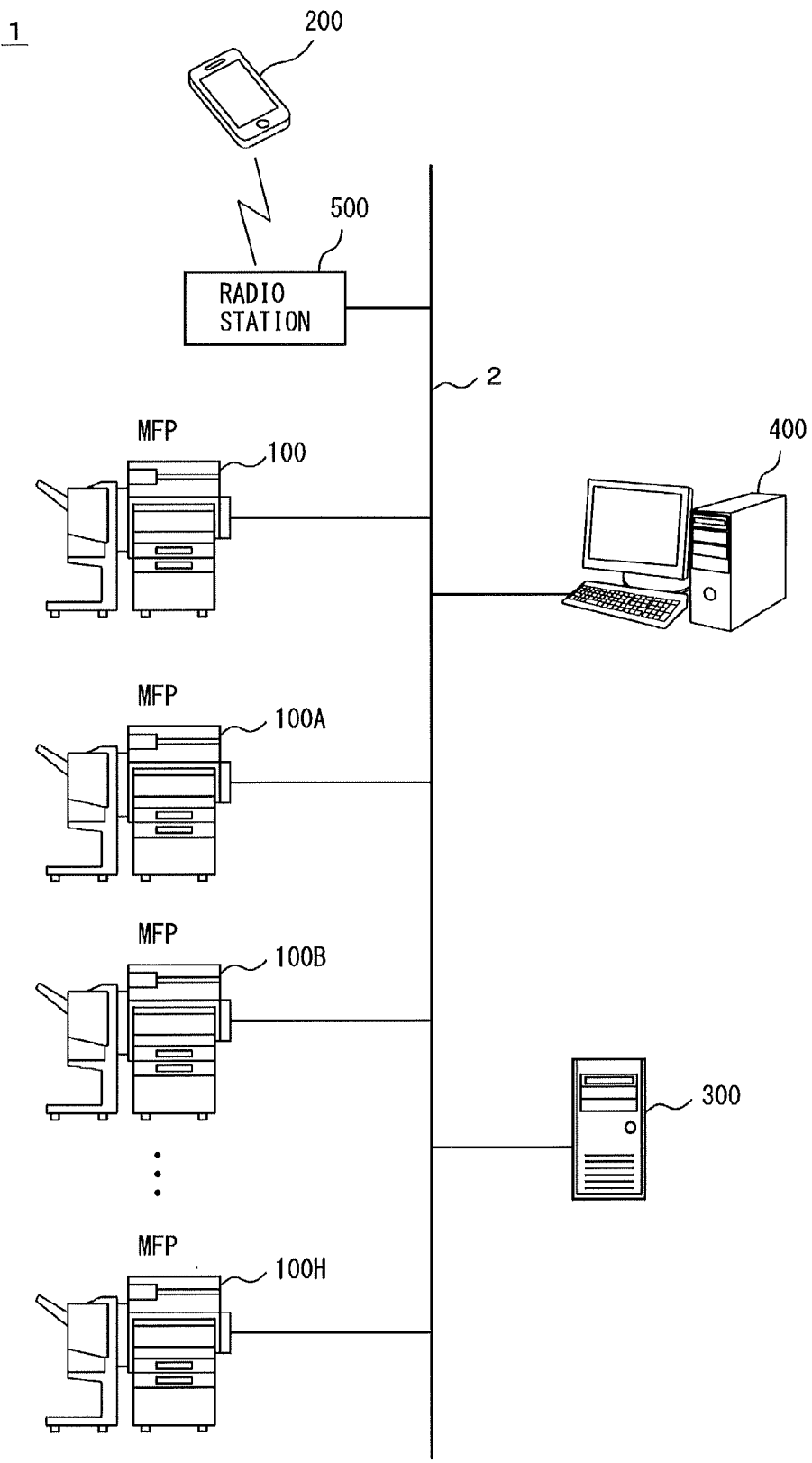
FIG. 1 is a diagram showing an overview of a print system in an embodiment of the present invention.

FIG. 1 is a diagram showing an overview of a print system in an embodiment of the present invention. Referring to FIG. 1, print system 1 includes nine MFPs (Multi-Functional Peripherals) 100, 100A to 100H, a portable information device 200, a server 300, a personal computer (hereinafter referred to as "PC") 400, and a radio station 500, each being connected to a network 2.

MFPs 100, 100A to 100H are an example of image forming apparatuses. Each of MFPs 100, 100A to 100H functions as an image forming apparatus and has a document scan function for scanning a document, an image forming function for forming an image on a recording medium such as paper based on image data, and a facsimile transmission/reception function of transmitting/receiving facsimile data. Although MFPs 100, 100A to 100H are described in the present embodiment by way of example, MFPs 100, 100A to 100H may be replaced by other devices that have the function of forming an image, for example, printers or facsimile machines. MFPs 100, 100A to 100H have the same hardware and functions and therefore MFP 100 will be taken as an example in the following description, unless otherwise specified.

Portable information device 200 is a computer carried and used by a user, such as a smartphone or a PDA (Personal Digital Assistant). Here, portable information device 200 is a smartphone and includes a wireless LAN function and a call function. Portable information device 200 therefore can make a call by communicating with a mobile phone base station by radio to connect to a mobile phone network.

Network 2 is a Local Area Network (LAN), either wired or wireless. Network 2 is not limited to a LAN but may be a network using a Public Switched Telephone Network. Network 2 is further connected to a Wide Area Network (WAN) such as the Internet. Each of MFPs 100, 100A to 100H can transmit/receive data to/from server 300, PC 400, and radio station 500 through network 2.

Radio station 500 is a relay device of network 2 and communicates with portable information device 200 having the wireless LAN communication function to connect portable information device 200 to network 2. Portable information device 200 therefore can transmit/receive data to/from each of MFPs 100, 100A to 100H, server 300, and PC 300 through radio station 500 and network 2.

PC 400 and server 300 are general computers. Server 300 functions as a print server and also functions as an authentication server. When functioning as an authentication server, server 300 performs a process of authenticating the user who uses PC 400 or MFPs 100, 100A to 100H. Server 300 stores user data allocated to each user in advance and including user identification information for identifying the user and authentication information. When receiving the user identification information and authentication information input by a user from any one of PC 400, MFPs 100, and 100A to 100H, server 300 compares the received user identification information and authentication information with the user data stored in advance. If they agree, server 300 returns an authentication result indicating that the authentication is successful. If they do not agree, server 300 returns an authentication result indicating that the authentication is failed.

Although a password is used as authentication information in this example, the user's biometric information such as fingerprint, vein pattern and iris may be used for authentication. In this case, a reader for reading biometric information is connected to MFP 100, 100A to 100H, PC 400, and the user data stored in server 300 includes user identification information and biometric information. MFPs 100, 100A to 100H, PC 400 each receive the biometric information read by the reader. MFPs 100, 100A to 100H, PC 400 each transmit the biometric information received from the reader to server 300 to allow server 300 to authenticate it.

PC 400 and MFPs 100, 100A to 100H each may function as an authentication server. In this case, server 300 does not have to function as an authentication server.

PC 400 is used by a user and performs a variety of processes by executing application programs. A variety of processes include a login process of authenticating a user and a print process of generating print data and allowing any one of MFPs 100, 100A to 100H to print it.

In print system 1 in the present embodiment, a pull printing driver program is installed in PC 400. PC 400 executes the pull printing driver program to allow print data to be temporarily stored in server 300. Server 300 is registered in PC 400 as a transmission destination of print data when the pull printing driver program is installed. For example, server 300 is registered by setting the network address of server 300.

PC 400 executes the pull printing driver program to allow any one of MFPs 100, 100A to 100H to print the print data. Specifically, for example, in a case where a user A logs in with user identification information "taro1" and gives an instruction to print data designated by user A, the pull printing driver program transmits a print job to server 300. The print job includes print data formed by converting the data designated by the user into a print format, print conditions, and the user identification information "taro1." The print conditions include the number of copies, the size of paper, color/monochrome, and print layout. The print conditions are determined based on the values accepted by PC 400 from the user.

Server 300 receives the print job from PC 400 and temporarily stores the print job. Subsequently, when user A having user identification information "taro1" logs in to any one of MFPs 100, 100A to 100H, for example, if user A logs in to MFP 100, MFP 100 transmits an acquisition request including the user identification information "tarot" of user A to server 300. Server 300 receiving the acquisition request transmits the print job that includes the user identification information "taro1" included in the acquisition request, among the temporarily stored print jobs, to MFP 100 that has transmitted the acquisition request. MFP 100 executes the print job received from server 300 and forms an image of the print data included in the print job on paper in accordance with the print conditions.

The print conditions may not be set in the print job in PC 400. The print data alone may be transmitted to server 300, and after the user logs in, the print conditions may be designated at the MFP which the user has logged in to, among MFPs 100, 100A to 100H.

MFPs 100, 100A to 100H may have the same hardware configuration or have different hardware configurations and at least has an image forming unit for forming an image on a sheet such as paper based on image data. Although the hardware configurations of MFPs 100, 100A to 100H may not be the same in some cases, MFP 100 here has a configuration that at least one of the other MFPs 100A to 100H has.

Figure 2:
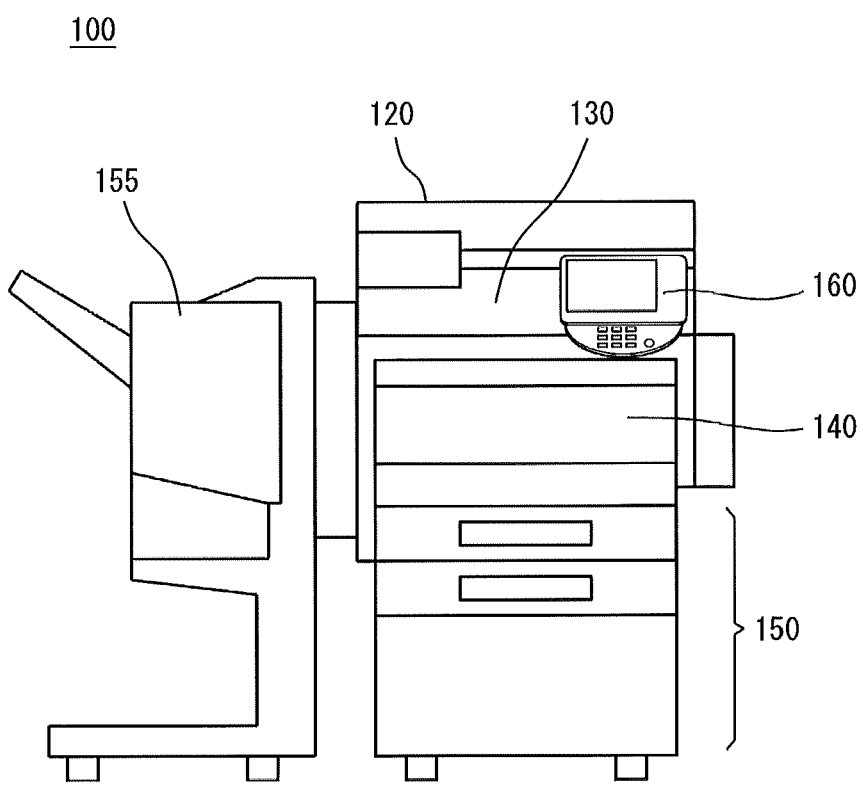
FIG. 2 is an external perspective view of an MFP.
Figure 3:
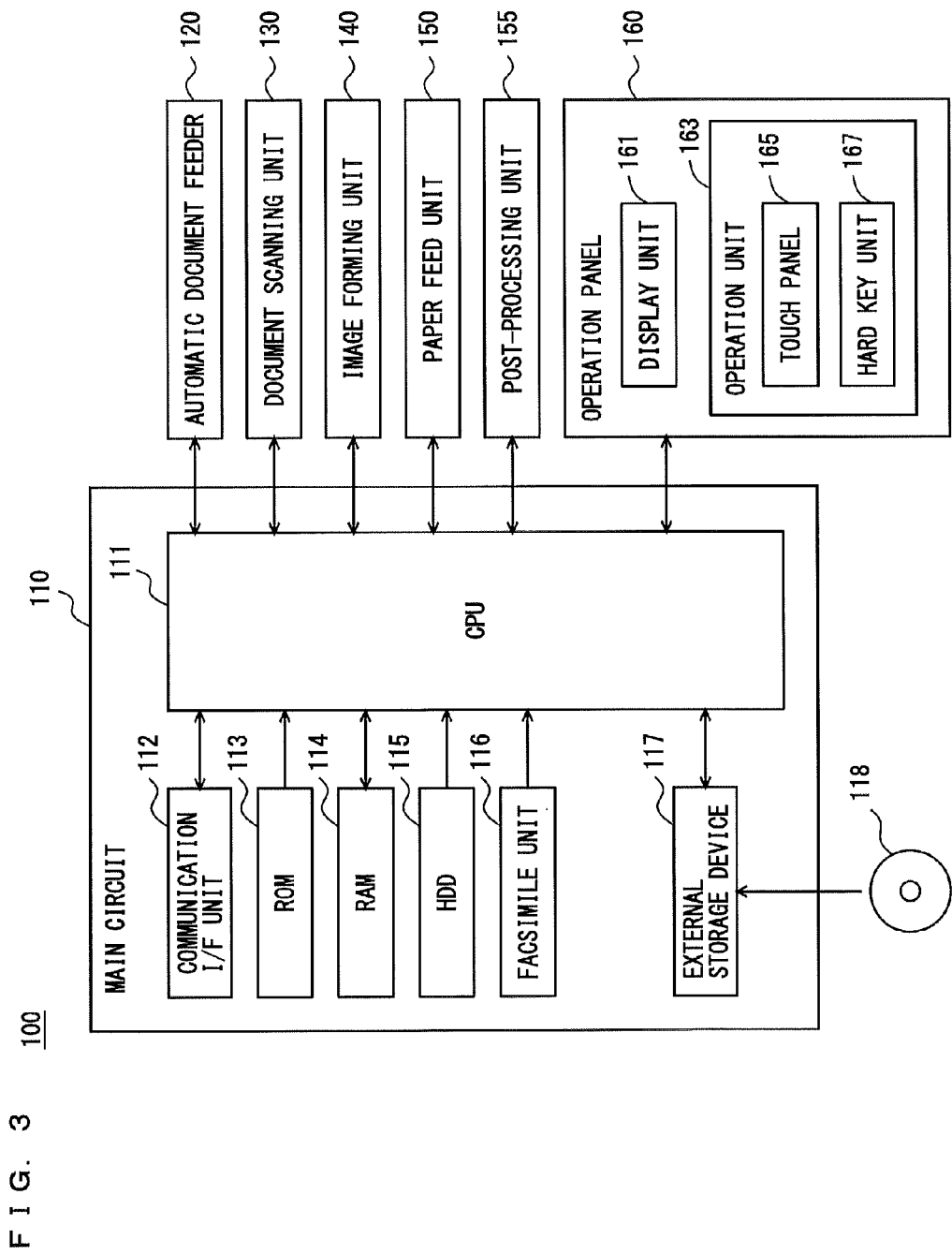
FIG. 3 is a block diagram showing an overall hardware configuration of the MFP.

FIG. 2 is an external perspective view of an MFP. FIG. 3 is a block diagram showing an overall hardware configuration of the MFP. Referring to FIG. 2 and FIG. 3, MFP 100 includes a main circuit 110, a document scanning unit 130 for scanning a document, an automatic document feeder 120 for conveying a document to document scanning unit 130, an image forming unit 140 for forming an image on a sheet of paper or other media based on image data output by document scanning unit 130 scanning a document, a paper feed unit 150 for supplying paper to image forming unit 140, a post-processing unit 155 for processing a sheet having an image formed thereon, and an operation panel 160 serving as a user interface.

Post-processing unit 155 executes a sorting process of sorting one or more sheets having an image formed by image forming unit 140 and outputting the sorted sheets, a punching process of punching holes, and a stapling process of stapling sheets.

Main circuit 110 includes a CPU 111, a communication I/F (interface) unit 112, a ROM (Read Only Memory) 113, a RAM (Random Access Memory) 114, an HDD (Hard Disk Drive) 115 serving as a mass storage device, a facsimile unit 116, and an external storage device 117 to which a CD-ROM 118 is attached. CPU 111 is connected to automatic document feeder 120, document scanning unit 130, image forming unit 140, paper feed unit 150, post-processing unit 155, and operation panel 160 to control the entire MFP 100.

ROM 113 stores a program executed by CPU 111 or data necessary to execute the program. RAM 114 is used as a working area when CPU 111 executes a program. RAM 114 temporarily stores scan data (image data) successively sent from document scanning unit 130.

Operation panel 160 is provided on the top face of MFP 100 and includes a display unit 161 and an operation unit 163. Display unit 161 is a display device such as an LCD (Liquid Crystal Display) or an organic ELD (Electro-Luminescence Display) and displays instruction menus to the user and information about the acquired image data. Operation unit 163 includes a hard key unit 167 including a plurality of keys and accepts input of a variety of instructions and data such as characters and numerals through the user's operation corresponding to the keys. Operation unit 163 further includes a touch panel 165 provided on display unit 161.

Communication I/F unit 112 is an interface for connecting MFP 100 to network 2. CPU 111 communicates with MFPs 100A to 100H, PC 300, server 300, or portable information device 200 through communication I/F unit 112 to transmit/receive data. Communication I/F unit 112 can communicate with a computer connected to the Internet through network 2.

Facsimile unit 116 is connected to a PSTN (Public Switched Telephone Network) to transmit facsimile data to the PSTN or receive facsimile data from the PSTN. Facsimile unit 116 stores the received facsimile data into HDD 115 or outputs the received facsimile data to image forming unit 140. Image forming unit 140 prints the facsimile data received by facsimile unit 116 on paper. Facsimile unit 116 also converts data stored in HDD 115 into facsimile data and transmits the facsimile data to a facsimile machine connected to the PSTN.

CD-ROM (Compact Disk ROM) 118 is attached to external storage device 117. CPU 111 can access CD-ROM 118 through external storage device 117. CPU 111 loads a program stored in CD-ROM 118 attached to external storage device 117 into RAM 114 for execution. A medium for storing a program executed by CPU 111 is not limited to CD-ROM 118 but may be an optical disk (MO (Magnetic Optical Disc)/MD (Mini Disc)/DVD (Digital Versatile Disc)), an IC card, an optical card, or a semiconductor memory such as a mask ROM, an EPROM (Erasable Programmable ROM), or an EEPROM (Electrically EPROM).

The program executed by CPU 111 is not limited to a program stored in CD-ROM 118. CPU 111 may load a program stored in HDD 115 into RAM 114 for execution. In this case, another computer connected to network 2 may overwrite the program stored in HDD 115 or additionally write a new program. MFP 100 may download a program from another computer connected to network 2 and store the program into HDD 115. The program referred to here includes not only a program directly executable by CPU 111 but also a source program, a compressed program, an encrypted program, and the like.

In print system 1, data is transmitted/received between MFPs 100, 100A to 100H, portable information device 200, server 300, and PC 400. Any protocol for transmitting/receiving data can be used as long as the sender can be specified at the receiver device. Examples of the protocol for transmitting/receiving data include HTTP (Hyper Text Transfer Protocol), FTP (File Transfer Protocol), SMPT (Simple Mail Transfer Protocol), and POP (Post Office Protocol).

Figure 4:
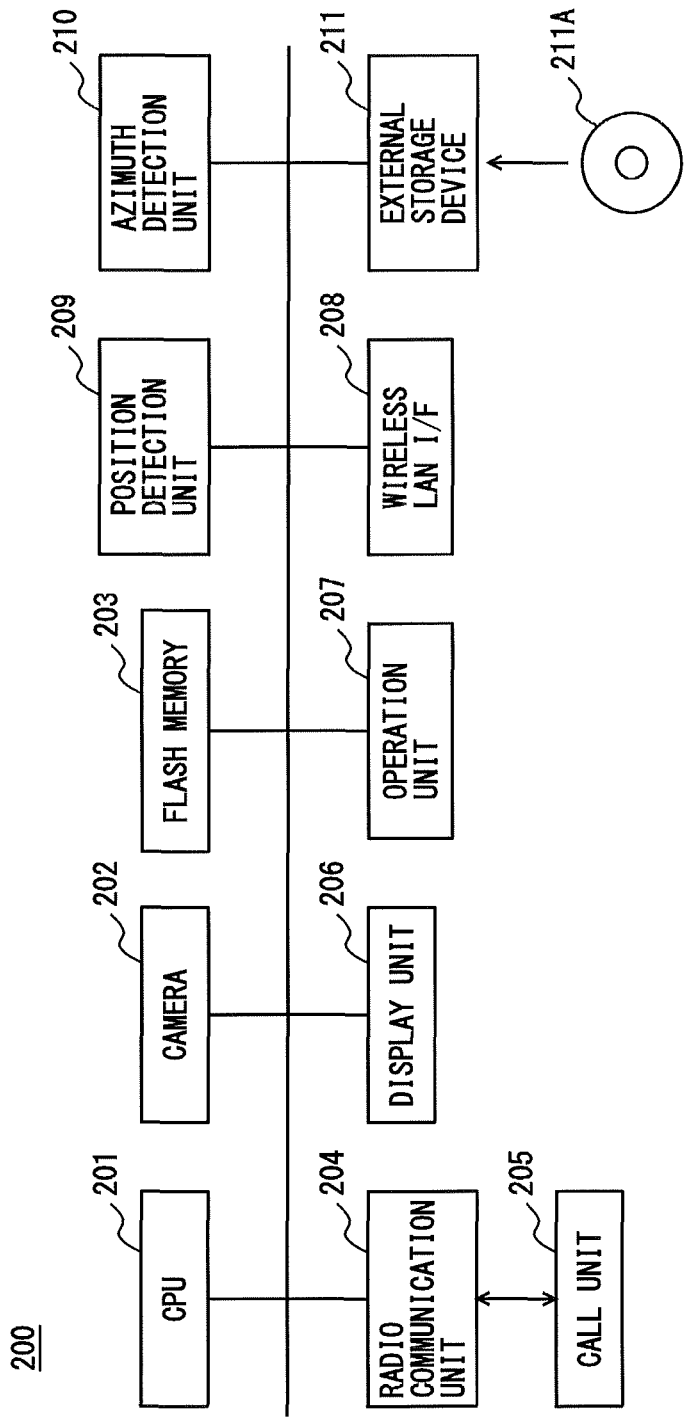
FIG. 4 is a block diagram showing an example of an overall hardware configuration of a portable information device in the present embodiment.

FIG. 4 is a block diagram showing an example of the overall hardware configuration of the portable information device in the present embodiment. Referring to FIG. 4, portable information device 200 in the present embodiment includes a CPU 201 for controlling portable information device 200 as a whole, a camera 202, a flash memory 203 for storing data in a nonvolatile manner, a radio communication unit 204 connected to a call unit 205, a display unit 206 for displaying information, an operation unit 207 for accepting user's operation, a wireless LAN I/F 208, a position detection unit 209, an azimuth detection unit 210, and an external storage device 211.

Radio communication unit 204 communicates by radio with a mobile phone base station connected to a telephone communication network. Radio communication unit 204 connects portable information device 200 to the telephone communication network and enables a call using call unit 205. Radio communication unit 204 demodulates a radio signal received from the mobile phone base station, and decodes the demodulated voice signal, and outputs the decoded signal to call unit 205. Radio communication unit 204 also encodes voice input from call unit 205 and transmits the encoded signal to the mobile phone base station. Call unit 205 includes a microphone and a speaker to output voice input from radio communication unit 204 from the speaker and to output voice input from the microphone to radio communication unit 204. Radio communication unit 204 is controlled by CPU 201 to connect portable information device 200 to an email server and transmit/receive an email.

Camera 202 includes a lens and a photoelectric transducer, images light collected by the lens on the photoelectric transducer, and outputs image data to CPU 201. Examples of the photoelectric transducer include a CMOS (Complementary Metal Oxide Semiconductor) sensor and a CCD (Charge Coupled Device) sensor.

Display unit 206 is a display device such as a liquid crystal display (LCD) or an organic ELD and displays instruction menus to the user and information about the acquired image data. Operation unit 207 includes a plurality of keys and accepts inputs of various instructions and data such as characters and numerals through the user's operation corresponding to keys.

Wireless LAN I/F 208 is an interface communicating with radio station 500 to connect portable information device 200 to network 2. The IP (Internet Protocol) addresses of server 300, MFPs 100, 100A to 100H, PC 400 are registered in portable information device 200, so that portable information device 200 can communicate with server 300, MFPs 100, 100A to 100H, PC 400 and transmit/receive data. In the present embodiment, portable information device 200 communicates with server 300, MFPs 100, 100A to 100H, PC 400 using wireless LAN I/F 208, by way of example. However, another communication method can be used. Specifically, in a case where portable information device 200, server 300, MFPs 100, 100A to 100H, PC 400 are equipped with devices for near field communication, for example, such as Bluetooth (registered trademark), portable information device 200 may perform one-to-one communicate with any one of server 300, MFPs 100, 100A to 100H, PC 400. Alternatively, portable information device 200 may be connected with any one of server 300, MFPs 100, 100A to 100H, PC 400 by wire such as a USB (Universal Serial Bus) cable, so that portable information device 200 performs one-to-one communicate with any one of server 300, MFPs 100, 100A to 100H, PC 400.

Flash memory 203 stores a program executed by CPU 201 or data necessary for executing the program. CPU 201 loads the program stored in flash memory 203 into the RAM of CPU 201 for execution.

Position detection unit 209 detects the current position of portable information device 200. Specifically, position detection unit 209 is a Global Positioning System (GPS) receiver and receives radio waves from GPS satellites thereby measuring the current position. Position detection unit 209 outputs a value indicating the measured current position, for example, latitude and longitude, to CPU 201.

Azimuth detection unit 210 detects the azimuth of the direction in which camera 202 of portable information device 200 is pointed. Specifically, azimuth detection unit 210 is a geomagnetic sensor for measuring geomagnetism. Azimuth detection unit 210 outputs the detected azimuth to CPU 201. Azimuth detection unit 210 is installed in portable information device 200 so as to be able to detect the direction in which camera 202 captures an image, in other words, the direction in which the optical axis of the lens of camera 202 is oriented. Azimuth detection unit 210 is not limited to a geomagnetic sensor but may be a gyro sensor.

External storage device 211 is removable from portable information device 200. A CD-ROM 211A storing a remote operation program can be attached thereto. CPU 201 can access. CD-ROM 211A through external storage device 211. CPU 201 can load the remote operation program stored in CD-ROM 211A attached to external storage device 211 into the RAM of CPU 201 for execution.

The program executed by CPU 201 is stored in flash memory 203 or CD-ROM 211A in the foregoing description. However, another computer connected to network 2 may overwrite the program stored in flash memory 203 or additionally write a new program. Portable information device 200 may download a program from another computer connected to network 2. The program referred to here includes not only a program directly executable by CPU 201 but also a source program, a compressed program, an encrypted program, and the like.

The medium for storing a program executed by CPU 201 is not limited to CD-ROM 211A but may be an optical disk (MO/MD/DVD), an IC card, an optical card, or a semiconductor memory such as a mask ROM, an EPROM, and an EEPROM.

Figure 5:
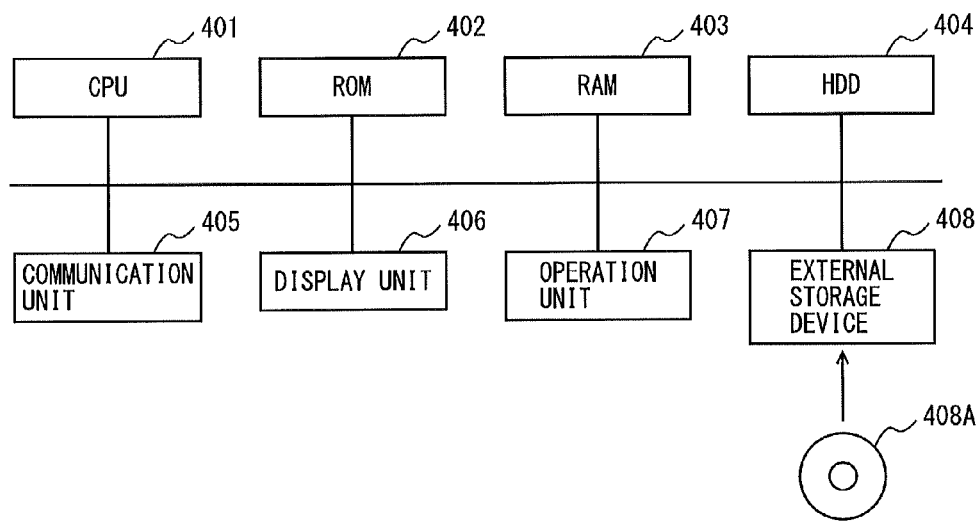
FIG. 5 is a block diagram showing an example of an overall hardware configuration of a PC in the present embodiment.

FIG. 5 is a block diagram showing an example of the overall hardware configuration of the PC in the present embodiment. Referring to FIG. 5, PC 400 includes a CPU 401 for controlling PC 400 as a whole, a ROM 402 for storing a program to be executed by CPU 401, a RAM 403 used as a working area for CPU 401, an HDD 404 for storing data in a nonvolatile manner, a communication unit 405 for connecting CPU 401 to network 2, a display unit 406 for displaying information, an operation unit 407 for accepting input of the user's operation, and an external storage device 408 to which a CD-ROM 408A can be attached.

Figure 6:
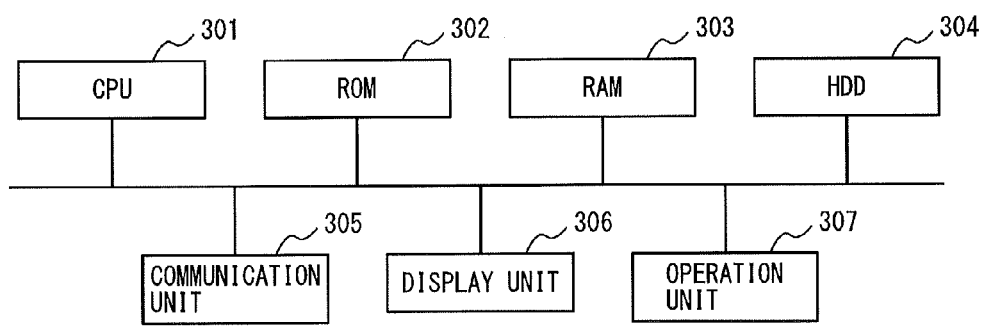
FIG. 6 is a block diagram showing an example of an overall hardware configuration of a server in the present embodiment.

FIG. 6 is a block diagram showing an example of the overall hardware configuration of the server in the present embodiment. Referring to FIG. 6, server 300 includes a CPU 301 for controlling server 300 as a whole, a ROM 302 for storing a program to be executed by CPU 301, a RAM 303 used as a working area for CPU 301, an HDD 304 for storing data in a nonvolatile manner, a communication unit 305 for connecting CPU 301 to network 2, a display unit 306 for displaying information, and an operation unit 307 for accepting input of the user's operation.

Figure 7:
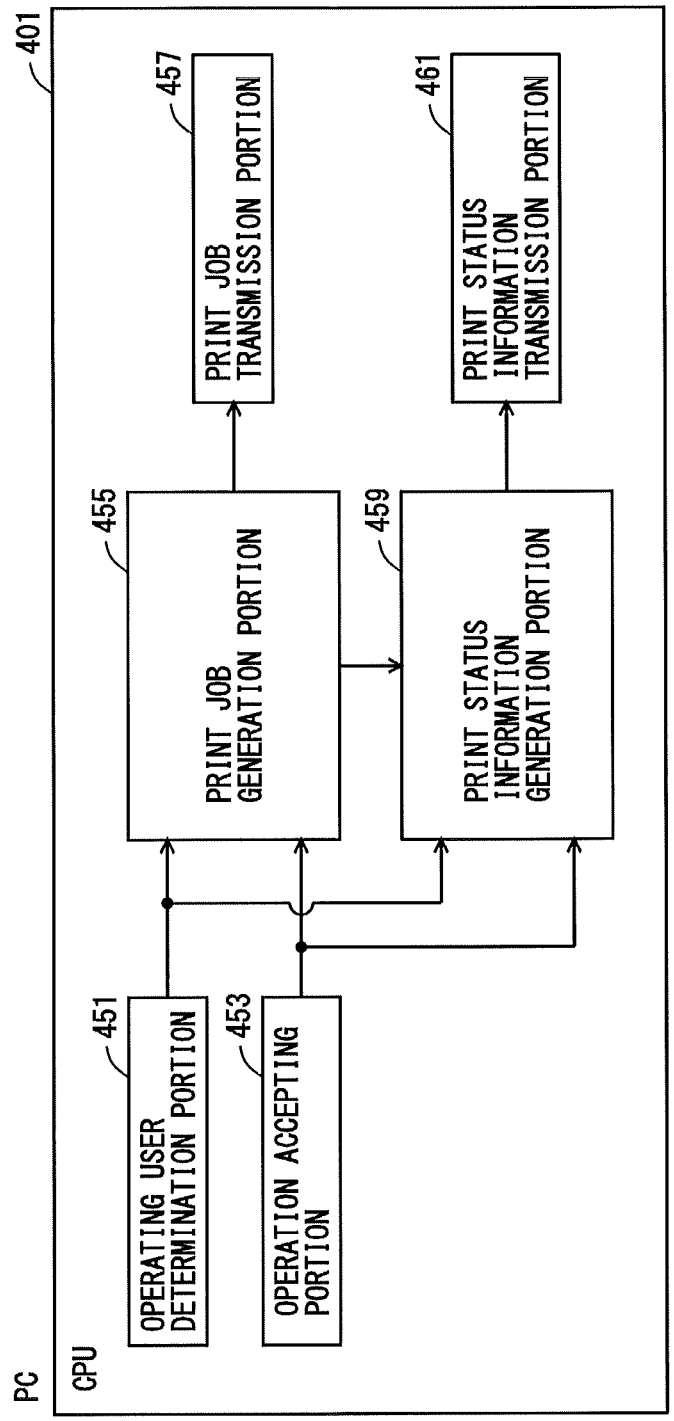
FIG. 7 is a block diagram showing an example of functions of the CPU of the PC.

FIG. 7 is a block diagram showing an example of functions of the CPU of the PC. The functions of CPU 401 of PC 400 shown in FIG. 7 are formed in CPU 401 by CPU 401 executing the pull printing driver program stored in ROM 402, HDD 404, or CD-ROM 408A. Referring to FIG. 7, CPU 401 includes an operating user determination portion 451 for determining an operating user, an operation accepting portion 453 for accepting an operation by a user, a print job generation portion 455 for generating a print job, a print job transmission portion 457 for transmitting a print job to server 300, a print status information generation portion 459 for generating print status information, and a print status information transmission portion 461 for transmitting print status information to portable information device 200.

Operating user determination portion 451 determines an operating user who operates operation unit 407. Specifically, an authentication screen for inputting user identification information and authentication information appears on display unit 406, and the user identification information and authentication information input by the operating user to operation unit 407 is accepted. Operating user determination unit 451 transmits the user identification information and authentication information to server 300 and, if the authentication result returned from server 300 indicates that the authentication is successful, authenticates the operating user. When the operating user is authenticated, operating user determination unit 451 determines that the operating user is the user identified by the user identification information. When the operating user is determined, operating user determination unit 451 outputs the user identification information of the operating user to print job generation portion 455 and print status information generation portion 459.

Operation accepting portion 453 accepts an operation input by the operating user to operation unit 407. The operation includes an operation of inputting print conditions and an operation of designating data to be subjected to image formation. The data to be subjected to image formation includes, for example, application data stored in HDD 404. The print conditions include the number of copies, the size of paper, color/monochrome, and print layout. When print conditions are accepted, operation accepting portion 453 outputs the print conditions to print job generation portion 455 and print status information generation portion 459. When data to be subjected to image formation is accepted, operation accepting portion 453 outputs the data to print job generation portion 455.

Print job generation portion 455 generates a print job, based on the user identification information of the operating user that is input from operating user determination portion 451 and the data to be subjected to image formation and the print conditions that are input from operation accepting portion 453. Specifically, print job generation portion 455 generates print data by converting the data to be subjected to image formation into a print format and generates a print job including the user identification information of the operating user, the print conditions, and the print data. Print job generation portion 455 outputs the generated print job to print job transmission portion 457 and outputs job identification information for identifying the print job to print status information generation portion 459.

Print job transmission portion 457 transmits the print job to server 300 through communication unit 405. The print job is transmitted through communication unit 405 to the network address of server 300 that is stored in HDD 404 at a time when the pull printing driver program is installed.

Print status information generation portion 459 generates print status information including the user identification information of the operating user that is input from operating user determination portion 451, the job identification information input from print job generation portion 455, and the print conditions input from operation accepting portion 453, and outputs the generated print status information to print status information transmission portion 461.

Print status information transmission portion 461 transmits the print status information to portable information device 200 through communication unit 405. PC 400 stores user data in advance in which the user identification information is associated with the device identification information for identifying portable information device 200 allocated to the user. Portable information device 200 allocated to the operating user determined by operating user determination portion 451 is specified based on the user data. The user data may be stored in server 300, and the device identification information of the device allocated to the operating user may be received together with the authentication result from server 300 when operating user determination portion 451 determines the operating user.

Figure 8:
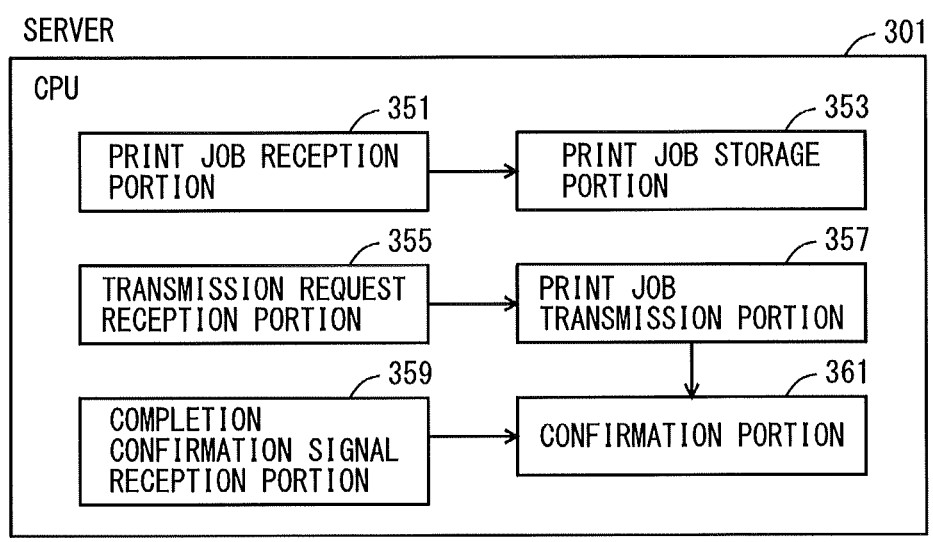
FIG. 8 is a block diagram showing an example of functions of the CPU of the server.

FIG. 8 is a block diagram showing an example of functions of the CPU of the server. The functions of CPU 301 of server 300 shown in FIG. 8 are formed in CPU 301 by CPU 301 executing a print data transmission program stored in ROM 302 or HDD 304.

Referring to FIG. 8, CPU 301 of server 300 includes a print job reception portion 351 receiving a print job from the outside, a print job storage portion 353 temporarily storing a print job, a transmission request reception portion 355 receiving a transmission request, a print job transmission portion 357 extracting a print job based on a transmission request and transmitting the print job to a device that has transmitted the transmission request, a Completion Confirmation signal reception portion 359, and a confirmation portion 361.

Print job reception portion 351 controls communication unit 305 to receive a print job from PC 400. Print job reception portion 351 receives a print job and outputs the received print job to print job storage portion 353.

Print job storage portion 353 receives the print job from print job reception portion 351 and stores the print job into HDD 304. The print job is thus stored into HDD 304. The print job includes print data, print conditions, and user identification information, in which the user giving an instruction to print, the print data, and the print conditions are associated with each other.

Transmission request reception portion 355 controls communication unit 305 to receive a transmission request from any of MFPs 100, 100A to 100H. The operation of transmitting a transmission request is the same among MFPs 100, 100A to 100H, and, here, MFP 100 will be taken as an example. When the user operating MFP 100 logs in and is successfully authenticated, MFP 100 transmits a transmission request including the user identification information of the user who has logged in, to server 300. The transmission request received by transmission request reception portion 255 from MFP 100 includes the user identification information of the user who is operating MFP 100.

Transmission request reception portion 355 receives a transmission request and outputs to print job transmission portion 357 a set of the user identification information included in the transmission request and the device identification information for identifying the device that has transmitted the transmission request, among MFPs 100, 100A to 100H.

In response to input of a set of the user identification information and the device identification information from transmission request reception portion 355, print job transmission portion 357 extracts the print job that includes the same user identification information as the user identification information input from transmission request reception portion 355, from print jobs stored in HDD 305. Specifically, print job transmission portion 357 extracts the print job that includes the user identification information input from transmission request reception portion 355, from print jobs stored in HDD 305. In a case where a plurality of print jobs that include the user identification information input from transmission request reception portion 355 are stored in HDD 305, print job transmission portion 357 extracts all the print jobs.

Print job transmission portion 357 transmits the print job extracted based on the transmission request to the device that has transmitted the transmission request among MFPs 100, 100A to 100H. Specifically, print job transmission portion 357 transmits one or more extracted print jobs to the device specified by the device identification information input from transmission request reception portion 355, among MFPs 100, 100A to 100H, through communication unit 305. When a print job is transmitted, print job transmission portion 357 outputs a transmission signal including the job identification information of the transmitted print job to confirmation portion 361 and deletes the transmitted print job from HDD 305.

Completion Confirmation signal reception portion 359 controls communication unit 305 to receive a Completion Confirmation signal from portable information device 200. The Completion Confirmation signal, which will be detailed later, is a signal transmitted by portable information device 200 to server 300 and includes job identification information. Completion Confirmation signal reception portion 359 receives the Completion Confirmation signal and outputs the received Completion Confirmation signal to confirmation portion 361.

Confirmation portion 361 receives the Completion Confirmation signal and determines whether the print job specified by the job identification information included in the Completion Confirmation signal has been transmitted to any one of MFPs 100, 100A to 100H. If the same job identification information as the job identification information included in the Completion Confirmation signal has been input from print job transmission portion 353, print job transmission portion 357 determines that the print job specified by the job identification information has been transmitted to any one of MFPs 100, 100A to 100H. If it is determined that the print job specified by the job identification information has been transmitted, confirmation portion 361 controls communication unit 305 to transmit a Transmission Completion signal to portable information device 200 that has transmitted the Completion Confirmation signal. If it is not determined that the print job specified by the job identification information has been transmitted, confirmation portion 361 controls communication unit 305 to transmit an Unsent signal to portable information device 200 that has transmitted the Completion Confirmation signal.

FIG. 9 is a block diagram showing an overview of functions of the CPU of the MFP in the present embodiment. The functions shown in FIG. 9 are formed in CPU 111 by CPU 111 of each of MFPs 100, 100A to 100H in the present embodiment executing a program stored in ROM 113, HDD 115, or CD-ROM 118. Here, the functions of the CPU of MFP 100 will be described by way of example. Referring to FIG. 9, CPU 111 of MFP 100 includes an authentication portion 51 for authenticating the user who operates MFP 100, a transmission request portion 53 for requesting server 300 to transmit a print job, a print job reception portion 55 receiving a print job, an image formation control portion 57 controlling image forming unit 140, a device information generation portion 59 generating device information, and a device information transmission portion 61 transmitting the device information.

Authentication portion 51 authenticates the user who operates MFP 100. Specifically, authentication portion 51 displays a log-in screen on display unit 161. The log-in screen includes an area for inputting user identification information and an area for inputting a password. When the user inputs user identification information and a password to operation unit 163, authentication portion 51 accepts the user identification information and password from operation unit 163 and transmits authentication information including the accepted user identification information and password to server 300 through communication I/F 112 to allow server 300 to perform authentication. Specifically, the device identification information of server 300 is preset in MFP 100 by the user and stored in HDD 115.

When communication I/F unit 112 receives the authentication result from server 300, authentication portion 51 accepts the authentication result. If the authentication result indicates that the authentication is successful, authentication portion 51 outputs the user identification information of the log-in user to transmission request portion 53. If the authentication result indicates that the authentication is failed, authentication portion 51 displays an error message on display unit 161. If the authentication result indicates that the authentication is successful, authentication portion 51 accepts the operation input to operation unit 161 as an operation by the operating user authenticated and permitted to log in, until a log-out instruction is input later.

Transmission request portion 53 requests server 300 to transmit a print job related to the user authenticated by authentication portion 51. Specifically, in response to input of user identification information from authentication portion 51, transmission request portion 53 transmits a transmission request including the user identification information to server 300 and outputs the transmission request to print job reception portion 55. As described above, server 300 receiving the transmission request specifies one or more print jobs that include the user identification information included in the transmission request and returns the specified one or more print jobs.

Print job reception portion 55 controls communication I/F unit 112 to receive the print job returned from server 300 after the transmission request is input from transmission request portion 53. Print job reception portion 55 outputs the received print job to image formation control portion 57.

Image formation control portion 57 receives the print job from print job reception portion 55 and forms an image of print data included in the print job on a sheet of paper, in accordance with the print conditions. Specifically, the print data and the print conditions are output to image forming unit 140 so that image forming unit 140 forms an image of the print data on a sheet of paper in accordance with the print conditions.

Device information generation portion 59 generates device information. The device information includes the image forming ability of MFP 100 and state information indicating the current state of MFP 100. The image forming ability includes the speed of forming an image. The image forming ability may include print conditions that can be set. The print conditions include monochrome/color, whether post-processing of processing paper after image formation, such as sorting and punching, is executable, and the size of paper on which MFP 100 can form an image. The state information includes the scheduled completion time at which the accumulated print job is to be finished, and the number of sheets left at the time when the accumulated print job is finished. The state information further includes trouble identification information for identifying a trouble such as paper jam, if any. The state information further includes information indicating that operation panel 160 is being operated by a user, if applicable. Device information generation portion 59 outputs the generated device information to device information transmission portion 61.

Device information transmission portion 61 receives the device information from device information transmission portion 61 and, when receiving a device information request for requesting transmission of the device information from the outside, transmits the device information to the device that has transmitted the device information request, through communication I/F unit 112. In the present embodiment, portable information device 200 described later transmits a device information transmission request to MFPs 100, 100A to 100H. Device information transmission portion 61 then transmits the device information input from device information generation portion 59 to portable information device 200 through communication I/F unit 112, in response to communication I/F unit 112 receiving the device information request from portable information device 200.

FIG. 10 is a block diagram showing an overview of functions of the CPU of the portable information device in the present embodiment. The functions shown in FIG. 10 are functions formed in CPU 201 by CPU 201 of portable information device 200 executing a remote control program stored in flash memory 203 or CD-ROM 211A. Referring to FIG. 10, CPU 201 includes a print status information reception portion 251, a device position detection portion 257, a usability information generation portion 253, and a usability information output portion 255.

Print status information reception portion 251 controls wireless LAN I/F unit 208 to receive print status information transmitted by PC 400. Print status information reception portion 251 outputs the print status information to usability information generation portion 253 in response to the print status information received from PC 400.

Device position detection portion 257 allows position detection unit 209 to measure the current position and acquires the current position output by position detection unit 209. Device position detection portion 257 outputs position information indicating the acquired current position to usability information generation portion 253.

Usability information generation portion 253 generates usability information for allowing at least one of MFPs 100, 100A to 100H to execute the print job identification information included in the print status information. The details of usability information generation portion 253 will be described later. Usability information generation portion 253 outputs the generated usability information to usability information output portion 255.

In response to input of an output instruction from usability information generation portion 253, usability information output portion 255 outputs the usability information input from usability information generation portion 253 at the timing when it is input from usability information generation portion 253. Specifically, the usability information appears on display unit 206, and the speaker of portable information device 200 produces an alarm sound.

Figure 11:
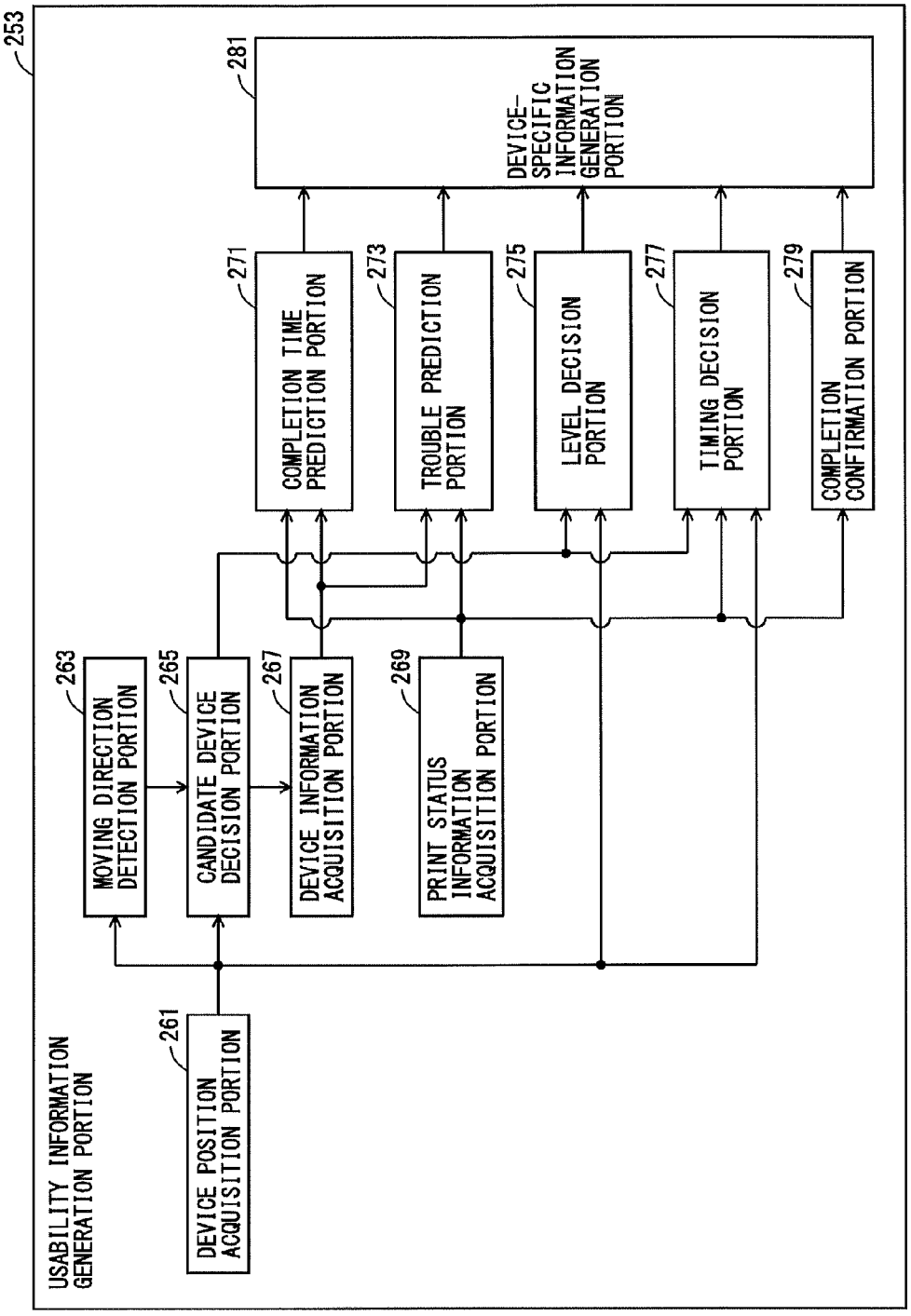
FIG. 11 is a block diagram showing an example of detailed functions of a usability information generation portion.

FIG. 11 is a block diagram showing an example of detailed functions of usability information generation portion 253. Referring to FIG. 11, usability information generation portion 253 includes device position acquisition portion 261 acquiring position information indicating the position of portable information device 200, a moving direction detection portion 263 detecting the direction in which the user moves, a candidate device decision portion 265 deciding one or more candidate devices from among MFPs 100, 100A to 100H, a device information acquisition portion 267 for acquiring the device information from the candidate device, a print status information acquisition portion 269 for acquiring print status information, a timing decision portion 277, a completion time prediction portion 271, a trouble prediction portion 273, a level decision portion 275, a device-specific information generation portion 281 for generating usability information for each of one or more candidate devices, and a completion confirmation portion 279.

Print status information acquisition portion 269 controls wireless LAN I/F 208 to receive the print status information transmitted by PC 400. Print status information acquisition portion 269 outputs the received print status information to timing decision portion 277, completion time prediction portion 271, trouble prediction portion 273, timing decision portion 277, and completion confirmation portion 279.

Device position acquisition portion 261 acquires the position information of portable information device 200 input from device position detection portion 257 and outputs the acquired position information of portable information device 200 to moving direction detection portion 263, candidate device decision portion 265, level decision portion 275, and timing decision portion 277.

Moving direction detection portion 263 detects the moving direction of portable information device 200 using a plurality of position information input at different times from device position acquisition portion 261. Specifically, moving direction detection portion 263 decides the direction from the position specified by the position information input at the previous time to the position specified by the position information input at the subsequent time, as the moving direction. The moving direction is preferably an azimuth as the absolute value. Moving direction detection portion 263 outputs the detected moving direction to candidate device decision portion 265.

Candidate device decision portion 265 receives the moving direction of portable information device 200 from moving direction detection portion 263 and receives the position information of portable information device 200 from device position acquisition portion 261. Candidate device decision portion 265 decides one or more registered devices that satisfy a predetermined condition, as the candidate device.

The registered devices are image forming apparatuses registered in advance by candidate device decision portion 265 and here MFPs 100, 100A to 100H. Candidate device decision portion 265 stores the device identification information of the registered devices in advance.

Specifically, candidate device decision portion 265 calculates the relative positional relationship between portable information device 200 and each of the registered devices, namely, MFPs 100, 100A to 100H. The relative positional relationship includes the distance between portable information device 200 and each of MFPs 100, 100A to 100H and the direction from portable information device 200 to each of MFPs 100, 100A to 100H. Candidate device decision portion 265 thus acquires the position information indicating the absolute position of each of MFPs 100, 100A to 100H. For example, the position information is represented by latitude and longitude. In a case where the position information of each of MFPs 100, 100A to 100H is stored in flash memory 203, the position information of each of MFPs 100, 100A to 100H is read from flash memory 203. Alternatively, an inquiry signal for asking the position information may be broadcasted via wireless LAN I/F 208, and the position information may be received from a device that responds to the inquiry signal, among MFPs 100, 100A to 100H.

Candidate device decision portion 265 decides a candidate device that satisfies a predetermined condition from among MFPs 100, 100A to 100H, based on the relative position information between portable information device 200 and each of MFPs 100, 100A to 100H and the moving direction of portable information device 200. The predetermined condition is that the device is present at the place to which portable information device 200 moves. Candidate device decision portion 265 decides the device present in the moving direction of portable information device 200, as the candidate device, among MFPs 100, 100A to 100H. Specifically, an area defined by the direction within a predetermined range from the moving direction is calculated with reference to the position of portable information device 200, based on the position information of portable information device 200 that is input from device position acquisition portion 261 and the moving direction of portable information device 200 that is input from moving direction detection portion 263. Candidate device decision portion 265 decides the device whose absolute position defined by the device information is present within the calculated area, as the candidate device, among MFPs 100, 100A to 100H. Candidate device decision portion 265 outputs the device identification information of the decided candidate device to device information acquisition portion 267 and outputs a set of the device identification information of the candidate device and the position information of the candidate device to level decision portion 275 and timing decision portion 277.

Device information acquisition portion 267 receives the device identification information of the candidate device from candidate device decision portion 265 and acquires the device information of the candidate device. In response to input of the device identification information of the candidate device from candidate device decision portion 265, device information acquisition portion 267 controls wireless LAN I/F 208 to output a device information request for requesting transmission of the device information to the candidate device. When wireless LAN I/F 208 receives the device information from the candidate device receiving the device information request, device information acquisition portion 267 outputs the device information received from the candidate device to completion time prediction portion 271 and trouble prediction portion 273. In other words, device information acquisition portion 267 outputs the device information corresponding to each candidate device to completion time prediction portion 271 and trouble prediction portion 273.

Timing decision portion 277 receives the position information of portable information device 200 from device position acquisition portion 261 and receives a set of the device identification information of the candidate device and the position information of the candidate device from device information acquisition portion 267 to decide the timing for outputting usability information.

Timing decision portion 277 decides the point of time when the number of candidate devices reaches a predetermined number, as a first output timing. The number of candidate devices decreases as portable information device 200 moves. Timing decision portion 277 decides the number of candidate devices by counting the number of sets input from device information acquisition portion 267.

Timing decision portion 277 decides the time when operation unit 107 accepts a predetermined operation by the user, as a second output timing.

Timing decision portion 277 decides the time when the user has moved a predetermined distance since the user transmitted a print job to server 300, as a third output timing. Specifically, the time when print status information acquisition portion 269 acquires print status information is determined as the time when the user transmits a print job to server 300. The moving distance is calculated using the position information of portable information device 200 input from device position acquisition portion 261. After the print status information is acquired by print status information acquisition portion 269, the moving distance is calculated using the position information of portable information device 200 that is input from device position acquisition portion 261, and the time when the calculated moving distance reaches a predetermined distance is decided as the third output timing.

Timing decision portion 277 decides any one of the first to third output timings and outputs an output instruction to device-specific information generation portion 281.

Completion time prediction portion 271 receives the print status information from print status information acquisition portion 269 and receives the device information of the candidate device from device information acquisition portion 267. When a print job specified by the print information is executed in the candidate device, completion time prediction portion 271 predicts the time when the print job will be completed and outputs a set of the state information including the predicted time and the device identification information of the candidate device to device-specific information generation portion 281. Specifically, the time spent for executing the print job in the candidate device is predicted as a job execution time, using the print speed of the image forming ability included in the device information of the candidate device and the number of sheets required for image formation that is included in the print conditions included in the print information. Completion time prediction portion 271 then calculates the time when execution of the print job will be completed from the scheduled completion time of the state information included in the device information of the candidate device and the calculated job execution time, and sets the calculated time as the completion time. Completion time prediction portion 271 outputs a set of the device identification information of the candidate device and the completion time to device-specific information generation portion 281.

Trouble prediction portion 273 receives the print status information from print status information acquisition portion 269 and receives the device information of the candidate device from device information acquisition portion 267, predicts a trouble that may occur in the candidate device, and outputs trouble information to device-specific information generation portion 281. The trouble includes paper out. Trouble prediction portion 273 determines whether paper out will occur, using the remaining number of sheets that is included in the device information and the number of sheets required for image formation that is included in the print conditions included in the print status information. If paper out occurs, a set of the device identification information of the candidate device and the number of sheets printable is output to device-specific information generation portion 281.

Level decision portion 275 receives a set of the device identification information of the candidate device and the position information of the candidate device from candidate device decision portion 265 and receives the position information of the portable information device from device position acquisition portion 261. Level decision portion 275 decides a level of usability information for each candidate device. The level of usability information is defined by the distance between portable information device 200 and the candidate device. The shorter is the distance between portable information device 200 and the candidate device, the higher is the level. A table is stored in which the relationship between the level of usability information and the distance is set in advance. Here, the levels of usability information include a first level in which the distance between portable information device 200 and the candidate device is equal to or less than a threshold TL1, and a second level in which the distance is greater than threshold TL1, by way of example. Threshold TL1 is, for example 10 m. Level decision portion 275 calculates the distance between the position specified by the position information of the candidate device and the position specified by the position information of the portable information device, and decides the level of usability information corresponding to the calculated distance by referring to the table. Level decision portion 275 outputs a set of the device identification information of the candidate device, the level of usability information, and the distance to the candidate device, to device-specific information generation portion 281.

Device-specific information generation portion 281 receives the output instruction from timing decision portion 277, receives a set of the device identification information of the candidate device and the completion time from completion time prediction portion 271, receives a set of the device identification information of the candidate device and the trouble information from trouble prediction portion 273 and receives a set of the device identification information of the candidate device, the level of usability information and the distance to the candidate device from level decision portion 275. Device-specific information generation portion 281 generates usability information corresponding to the level of usage information for each candidate device until a stop instruction is input from completion confirmation portion 279. The higher is the level of usability information, the greater is the amount of information.

Device-specific information generation portion 281 generates usability information for each candidate device every time the output instruction is input from timing decision portion 277, and outputs the generated usability information to usability information output portion 255. First, device-specific information generation portion 281 specifies the level of usability information, the completion time, the trouble information, and the distance to the candidate device for the candidate device for which usability information is to be generated. Device-specific information generation portion 281 then generates usability information at least including the device identification information for identifying the candidate device, the distance to the candidate device, and the completion time, as usability information corresponding to the candidate device with the first level of usability information.

Device-specific information generation portion 281 generates usability information at least including the distance to the candidate device, as usability information corresponding to the candidate device with the second level of usability information. In other words, the usability information of the second level includes information indicating the presence of a candidate device. Specifically, device-specific information generation portion 281 sorts the candidate devices with the second level of usability information, by distance ranges. The distance range is determined by the relative distance from portable information device 200. Here, the candidate device with the second level of usability information is a device whose relative distance from portable information device 200 is greater than threshold TL1, 10 m. The distance range is set such that the relative distance from portable information device 200 is equal to or greater than 10 m and at 10 m intervals. More specifically, when the relative distance of a candidate device from portable information device 200 is 50 m, which is the largest, the distance ranges include a first distance range in which the relative distance is greater than 10 m and equal to or less than 20 m, a second distance range greater than 20 m and equal to or less than 30 m, a third distance range greater than 30 m and equal to less than 40 m, and a fourth distance range greater than 40 m and equal to or less than 50 m. Device-specific information generation portion 281 thus sorts the candidate devices with the second level of usability information into a first group in which the relative distance from portable information device 200 is in the first distance range, a second group in the second distance range, a third group in the third distance range, and a fourth group in the fourth distance range.

Device-specific information generation portion 281 counts the number of candidate devices sorted into each of the first to fourth groups and adds the information indicating the distance range of the group and the number of devices to the usability information. The information indicating the distance range of the group is "20 m" for the first group, "30 m" for the second group, "40 m" for the third group, and "50 m" for the fourth group.

In a case where trouble information is specified corresponding to the candidate device, device-specific information generation portion 281 generates usability information including the trouble information as usability information corresponding to that candidate device, irrespective of the level of the usability information. Since the trouble information includes a paper-out event, the usability information includes a message to give a notice that a paper-out event will occur. The message says, for example, "Paper is running out. Prepare a refill."

Completion confirmation portion 279 receives the print status information from print status information acquisition portion 269. Completion confirmation portion 279 determines whether the print job specified by the job identification information included in the print status information has been executed in any one of MFPs 100, 100A to 100H. Specifically, a Completion Confirmation signal including the same job identification information as the job identification information included in the print status information is transmitted to server 300 through wireless LAN I/F 208. If the print job specified by the job identification information included in the Completion Confirmation signal has been transmitted to any one of MFPs 100, 100A to 100H, server 300 returns a Transmission Completion signal. If not transmitted, server 300 returns an Unsent signal.

If wireless LAN I/F 208 receives the Transmission Completion signal from server 300, completion confirmation portion 279 determines that the print job specified by the job identification information included in the print status information has been executed in any one of MFPs 100, 100A to 100H. If it is confirmed that the print job specified by the job identification information included in the print status information has been executed in any one of MFPs 100, 100A to 100H, completion confirmation portion 279 outputs a stop instruction to device-specific information generation portion 281.

Figure 12:
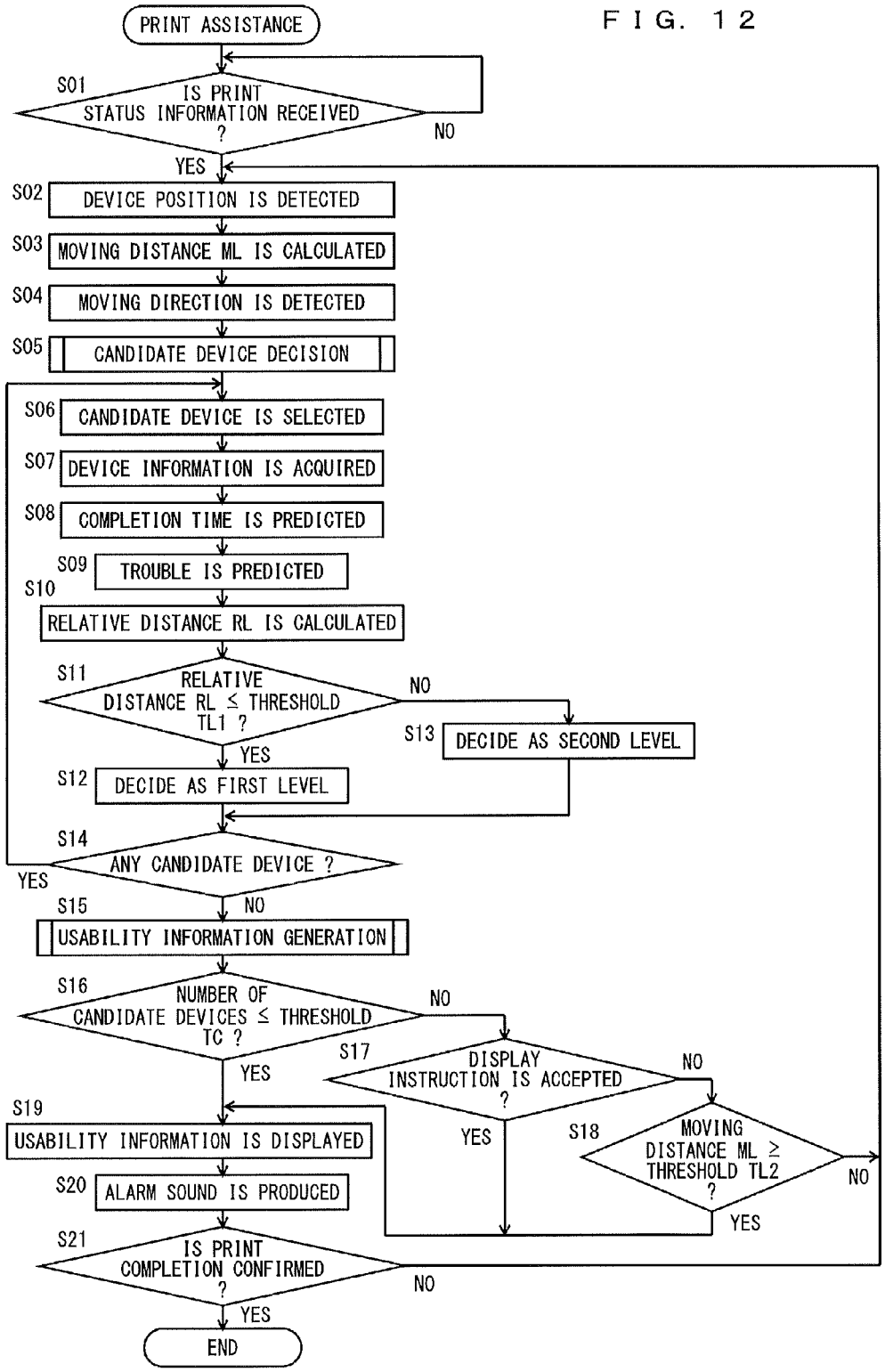
FIG. 12 is a flowchart showing an example of the procedure of a print assistance process.

FIG. 12 is a flowchart showing an example of the procedure of a print assistance process. The print assistance process is a process executed by CPU 201 by CPU 201 of portable information device 200 executing a usability information generation program stored in flash memory 203 or CD-ROM 211A. Here, the user having portable information device 200 operates PC 400 to input a print instruction, by way of example. In this case, PC 400 transmits a print job to server 300 and, when the user operates PC 400 to transmit a print job to server 300, PC 400 transmits print status information to portable information device 200 allocated to the user 200 in advance.

Referring to FIG. 12, CPU 201 determines whether print status information is received (step S01). The process waits until print status information is received (NO in S01). If print status information is received (YES in S01), the process proceeds to step S02. In other words, the print assistance process is a process executed on condition that print status information is received.

In step S02, a device position is detected. The position of portable information device 200 detected by position detection portion 209 is detected. The moving distance ML is then calculated (step S03), and the moving direction is detected (step S04). The moving distance ML and the moving direction are detected based on the positions detected at different times in step S02. The moving distance ML is the distance of movement from the position at the time when print status information is received in step S01.

In the next step S05, a candidate device decision process is executed, and the process proceeds to step S06. The candidate device decision process, which will be detailed later, is a process of deciding a device that satisfies a predetermined condition among MFPs 100, 100A to 100H capable of executing a print job, as a candidate device. Here, all of MFPs 100, 100A to 100H are decided as candidate devices, by way of example.

In step S06, one of a process target is selected from among the candidate devices. The device information is then acquired from the candidate device selected as a process target (step S07). Wireless LAN I/F 208 is controlled to request the candidate device to transmit the device information. When wireless LAN I/F 208 receives the device information from the candidate device requested to transmit the device information, the device information received from the candidate device is acquired.

In the next step S08, the completion time is predicted. In a case where the print job specified by the print status information received in step S01 is executed in the candidate device, the time when the print job will be completed is predicted. Specifically, the time spent for executing the print job in the candidate device is predicted as a job execution time, using the print speed of the image forming ability included in the device information acquired from the candidate device when the candidate device is decided in step S05, and the number of sheets required for image formation that is included in the print conditions included in the print information. In addition, the time when execution of the print job will be completed is calculated from the scheduled completion time of the state information included in the device information acquired from the candidate device and the predicted job execution time. The calculated time is then set as a completion time.

In the next step S09, a trouble of the candidate device is predicted. The trouble includes paper out. Trouble prediction portion 273 determines whether paper out will occur, using the remaining number of sheets that is included in the device information acquired from the candidate device when the candidate device is decided in step S05, and the number of sheets required for image formation that is included in the print conditions included in the print status information received in step S01. If it is determined that paper out will occur, it is predicted that a trouble will occur.

In the next step S10, a relative distance RL is calculated. Relative distance RL is the distance between portable information device 200 and the candidate device. Relative distance RL is calculated based on the position of portable information device 200 that is detected in step S02 and the position of the candidate device that is stored in advance. Relative distance RL is then compared with threshold TL1 (step S11). Threshold TL1 is a predetermined value for defining the level of usability information and can be set as desired. Here, threshold TL1 is 10 m. If relative distance RL is equal to or less than threshold TL1, the process proceeds to step S12. If not, the process proceeds to step S13. In step S12, the level of usability information corresponding to the candidate device is decided as the first level, and the process proceeds to step S14. In step S13, the level of usability information corresponding to the candidate device is decided as the second level lower than the first level. The process then proceeds to step S14.

In step S14, it is determined whether a candidate device not selected as a process target exists. If a candidate device not processed exists, the process returns to step S06. If not, the process proceeds to step S15. In step S15, a usability information generation process is executed, and the process proceeds to step S16. The usability information generation process, which will be detailed later, is a process of generating usability information for each candidate device.

In step S16, the number of candidate devices is compared with a threshold TC. Threshold TC is a predetermined value for deciding the first output timing and can be set as desired. Here, threshold TC is two. The number of MFPs decided as candidate devices in step S05 decreases as portable information device 200 moves. At a point of time when the number of candidate devices reaches threshold TC or less, the process proceeds to step S19. If not, the process proceeds to step S17. Since the number of candidate devices decreases with movement of portable information device 200, a plurality of initial candidate devices are narrowed down to a device on which the user will execute a print job. The usability information for the candidate device that is likely to be a device on which the user will execute a print job is thus provided.

In step S17, it is determined whether a display instruction is accepted. A display instruction is accepted when the user designates a key included in operation unit 207 and to which a display instruction is allocated. If a display instruction is accepted, the process proceeds to step S19. If not, the process proceeds to step S18. This is to provide the usability information at the second timing designated by the user.

In step S18, moving distance ML is compared with a threshold TL2. Moving distance ML is a distance of movement from the position of portable information device 200 at the time when print status information is received in step S01. The position of portable information device 200 at the time when print status information is received in step S01 is the position detected at the time when step S02 is executed initially, and the current position is the position detected at the time when step S02 is executed lastly. If moving distance ML is equal to or greater than threshold TL2, the process proceeds to step S19. If not, the process returns to step S02. Threshold TL2 is a predetermined value for deciding the third output timing and can be set as desired. Here, threshold value TL2 is 10 m.

In step S19, the usability information generated in step S15 is displayed on display unit 206. The process then proceeds to step S20. In step S20, an alarm sound is produced from the speaker of portable information device 200. The process then proceeds to step S21. This is to notify the user that the usability information is displayed. The user views the usability information to know that which of MFPs 100, 100A to 100H should execute the print job to shorten the wait time.

In step S21, it is determined whether print completion is confirmed. A Completion Confirmation signal including the print job identification information included in the print status information received in step S01 is transmitted to server 300, and if a Transmission Completion signal is received from server 300, print completion is confirmed. When server 300 receives a Completion Confirmation signal from portable information device 200, if the print job included in the Completion Confirmation signal has been transmitted to any one of MFPs 100, 100A to 100H, server 300 returns a Transmission Completion signal. If the print job has not been transmitted, server 300 returns an Unsent signal. If print completion is confirmed, the process ends. If not, the process returns to step S02.

Figure 13:
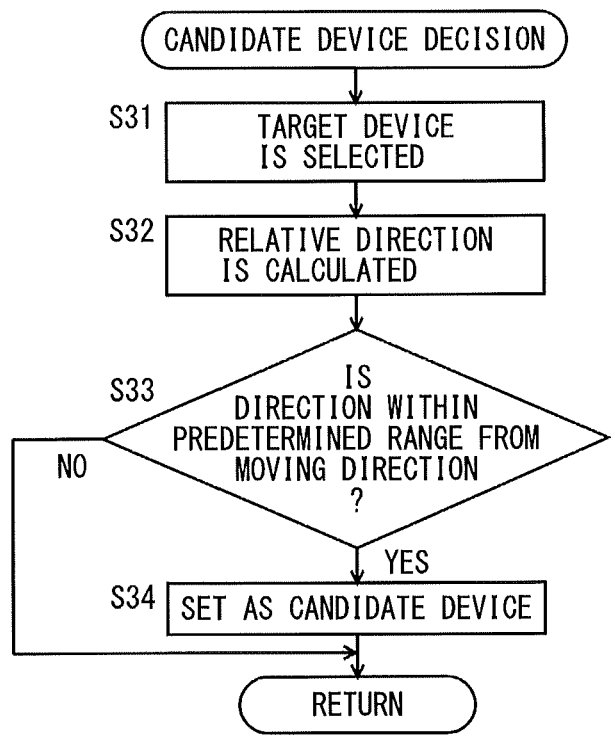
FIG. 13 is a diagram showing an example of the procedure of a candidate device decision process.

FIG. 13 is a diagram showing an example of the procedure of the candidate device decision process. The candidate device decision process is a process executed in step S05 in the print assistance process shown in FIG. 12. Referring to FIG. 13, CPU 201 selects one of the registered devices as a target device (step S31). The registered devices are MFPs 100, 100A to 100H in the present embodiment. The position information indicating the absolute positions of MFPs 100, 100A to 100H as the registered devices is stored in flash memory 203 in advance. An inquiry signal for asking the position information may be broadcasted via wireless LAN I/F 208, and a device that returns the absolute position in response to the inquiry signal, among MFPs 100, 100A to 100H, may be set as a registered device.

The relative direction is then calculated (step S32). The direction from portable information device 200 toward the target device is calculated as the relative direction, based on the absolute position of portable information device 200 that is detected in step S02 in the print assistance process and the absolute position of the target device. In the next step S33, it is determined whether the target device is present within a predetermined range from the moving direction of portable information device 200. The moving direction of portable information device 200 is the direction detected in step S04 in the print assistance process. A predetermined range is, for example, a range±5° from the moving direction. If the target device falls within the predetermined range from the moving direction of portable information device 200, the process proceeds to step S34. If not, the process proceeds to step S35.

In step S34, the target device is set as a candidate device. The process then proceeds to step S35. In step S35, it is determined whether a device not selected as a target device exists among the registered devices. If a registered device not selected exists, the process returns to step S31. If not, the process returns to the print assistance process.

Figure 14:
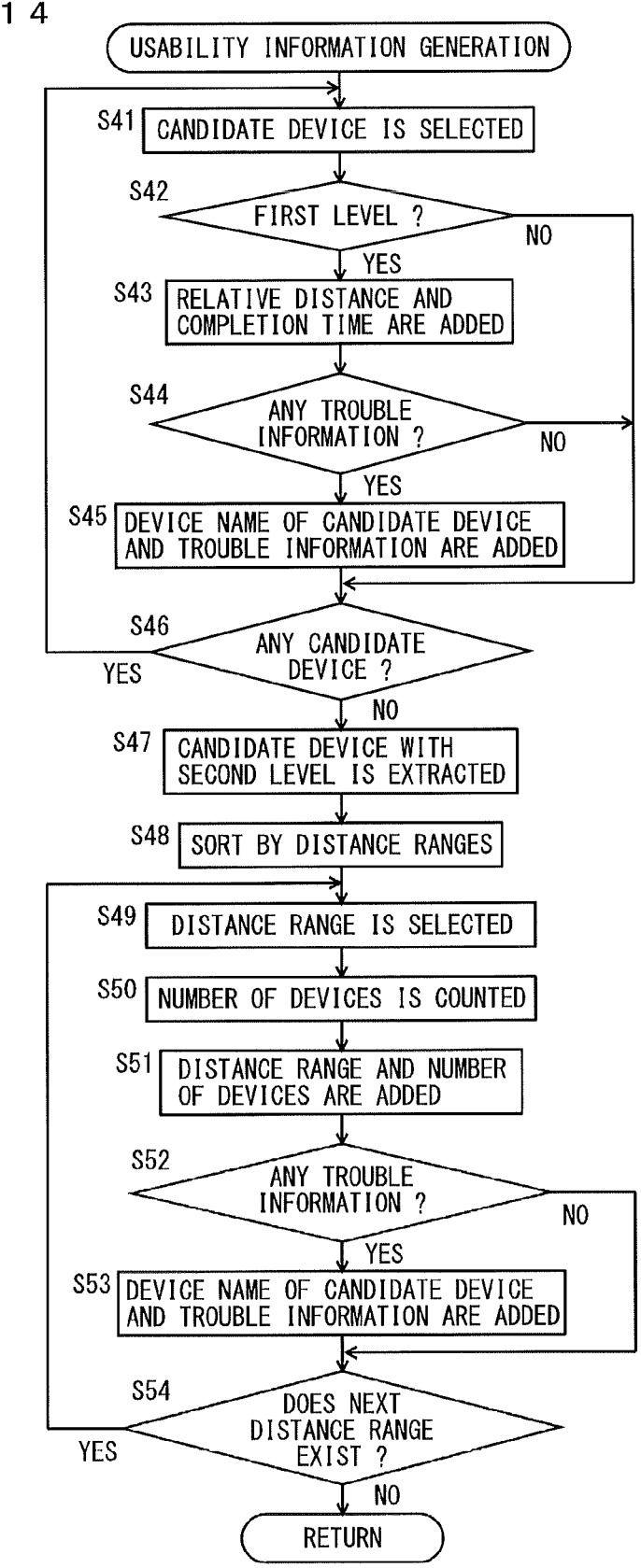
FIG. 14 is a flowchart showing an example of the procedure of a usability information generation process.

FIG. 14 is a flowchart showing an example of the procedure of the usability information generation process. The usability information generation process is a process executed in step S15 in the print assistance process shown in FIG. 12. Referring to FIG. 14, CPU 201 selects one of the candidate devices as a process target (step S41). In the next step S42, it is determined whether the level of usability information of the candidate device selected as a process target is the first level. If it is the first level, the process proceeds to step S43. If not, the process proceeds to step S46. In step S43, the relative distance of the candidate device selected as a process target and the completion time are added to the usability information. The relative distance calculated in step S10 in the print assistance process can be used as the relative distance of the candidate device, and the completion time predicted in step S08 in the print assistance process can be used as the completion time.

In step S44, it is determined whether trouble information exists for the candidate device selected as a process target. If trouble information has been generated in step S09 in the print assistance process for the candidate device selected as a process target, it is determined that trouble information exists. If trouble information exists, the process proceeds to step S45. If not, the process proceeds to step S46. In step S45, the device name of the candidate device selected as a process target and the trouble information are added to the usability information. The process then proceeds to step S46.

In step S46, it is determined whether a candidate device not selected as a process target in step S41 exists. If a candidate device not processed exists, the process returns to step S41. If not, the process proceeds to step S47.

In step S47, the candidate device with the second level of usability information is extracted from the candidate devices (step S48). The extracted candidate devices are sorted by distance ranges (step S48). The distance range of the candidate device is defined by the relative distance from portable information device 200. Here, the candidate device with the second level of usability information is a device whose relative distance from portable information device 200 is equal to or greater than threshold TL1, 10 m. The distance range is set such that the relative distance from portable information device 200 is equal to or greater than 10 m and at 10 m intervals. For example, when the relative distance of a candidate device from portable information device 200 is 50 m, which is the largest, the distance ranges include a first distance range in which the relative distance is greater than 10 m and equal to or less than 20 m, a second distance range greater than 20 m and equal to or less than 30 m, a third distance range greater than 30 m and equal to or less than 40 m, and a fourth distance range greater than 40 m and equal to or less than 50 m. The candidate devices with the second level of usability information are thus sorted into a first group in which the relative distance from portable information device 200 is in the first distance range, a second group in the second distance range, a third group in the third distance range, and a fourth group in the fourth distance range.

In the next step S49, a group is selected. One of the first to fourth groups is selected. The number of candidate devices sorted into the selected group is then counted (step S50). In the next step S51, the distance range and the number of devices are added to the usability information. The information indicating the distance range of the group selected in step S49 and the number of devices counted in step S50 are added to the usability information. If the first group is selected, the information "20 m" indicating the distance range of the first group and the number of candidate devices in the first group are added to the usability information. If the second group is selected, the information "30 m" indicating the distance range of the second group and the number of candidate devices in the second group are added to the usability information. If the third group is selected, the information "40 m" indicating the distance range of the third group and the number of candidate devices in the third group are added to the usability information. If the fourth group is selected, the information "50 m" indicating the distance range of the fourth group and the number of candidate devices in the fourth group are added to the usability information. For the group in which the number of devices is "0," usability information may not be added.

In the next step S52, it is determined whether trouble information exists for any of the candidate devices sorted into the group selected in step S49. If trouble information has been generated in step S09 in the print assistance process for any of the candidate devices sorted into the group, it is determined that trouble information exists. If trouble information exists, the process proceeds to step S53. If not, the process proceeds to step S54. In step S53, the device name of the candidate device and the trouble information are added to the usability information. The process then proceeds to step S54. In step S54, it is determined whether a group not processed exists. If a group not selected as a process target exists in step S49, the process returns to step S49. If a group not selected does not exist, the process returns to the print assistance process.

Figure 15:
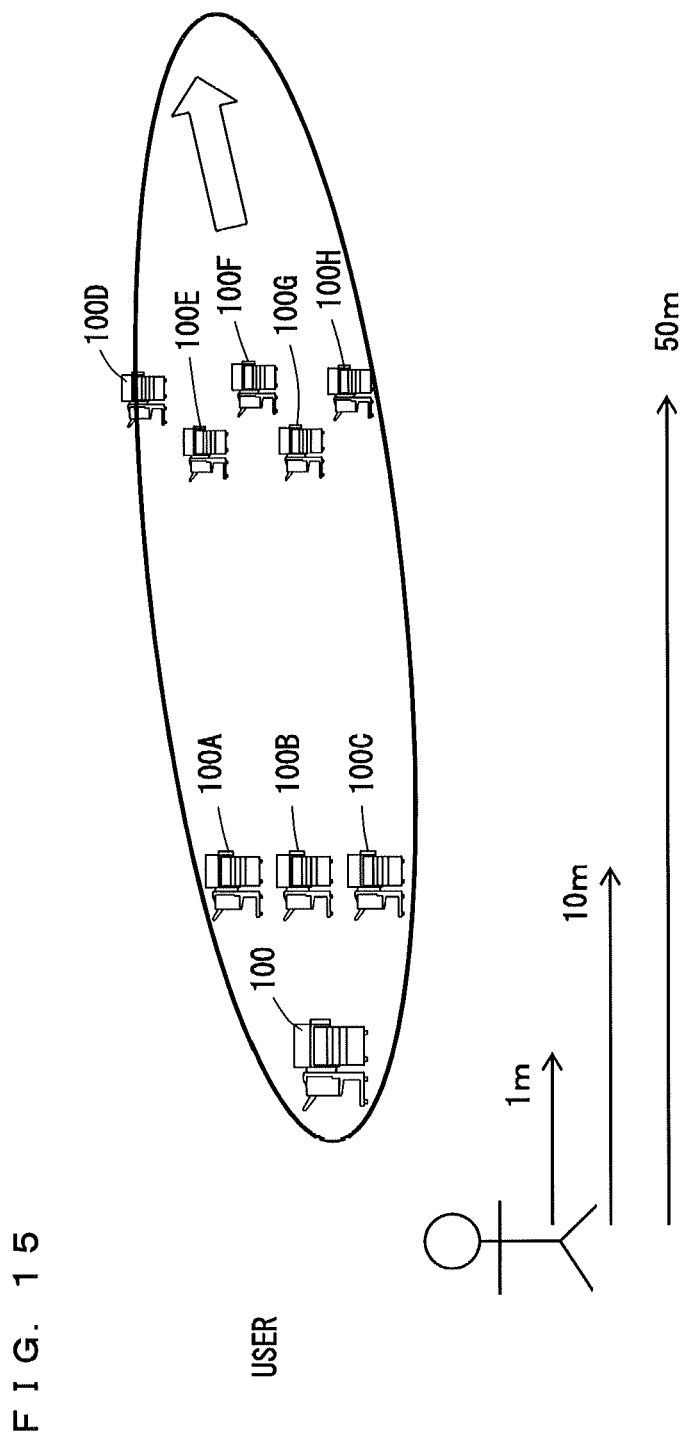
FIG. 15 is a first diagram showing an example of the positional relationship between candidate devices and a user at a first time.

The provision of usability information will now be described specifically. FIG. 15 is a first diagram showing an example of the positional relationship between candidate devices and a user at a first time. FIG. 15 shows the positional relationship between the candidate devices and the user at the first time while the user is moving in the arrow direction in the figure. Referring to FIG. 15, all of the nine MFPs 100, 100A to 100H included in print system 1 are present within a predetermined range from the user's moving direction. Accordingly, the nine MFPs 100, 100A to 100H are candidate devices.

MFP 100 is present at a distance of 1 m from the current position of the user. Three MFPs 100A, 100B, 100C are present at a distance of 10 m from the current position of the user. Five MFPs 100D, 100E, 100F, 100G, 100H are present at a distance of 50 m from the current position of the user.

FIG. 16 is a diagram showing an example of usability information at the first time. The usability information shown in FIG. 16 appears on display unit 206 of portable information device 200 carried by the user at the first time. Referring to FIG. 16, the usability information includes the usability information for MFP 100 located 1 m away from the user, "Authenticate with MFPA 1 m ahead and printing will be completed after 10 minutes." The usability information for MFP 100 is the first level and includes the completion time. "MFPA" is the name given to MFP 100.

The usability information includes the usability information for MFPs 100A, 100B, 100C located 10 m away from the user, "Three MFPs 10 m ahead are ready for printing." The usability information for MFPs 100A, 100B, 100C is the second level.

The usability information includes the usability information for MFP 100C, "MFPB will run out of paper after 50 sheets. Prepare a refill." "MFPB" is the name given to MFP 100C. The usability information "MFPB will run out of paper after 50 sheets. Prepare a refill." is trouble information for MFP 100C and is a message to give a notice that a paper-out event will occur.

The usability information includes the usability information for MFPs 100D to 100H located 50 m away from the user, "Five MFPs are available 50 m ahead." The usability information for MFPs 100D to 100H is the second level.

FIG. 17 is a diagram showing an example of the positional relationship between candidate devices and a user at a second time. FIG. 17 shows the relationship between the candidate devices and the user at the second time while the user is moving in the arrow direction in the figure. The second time is the time when the user has moved 10 m in the moving direction since the first time. Referring to FIG. 17, MFPs 100C, 100E, 100F, 100G, 100H out of nine MFPs 100, 100A to 100H included in print system 1 are present within a predetermined range from the user's moving direction. Accordingly, the five MFPs 100C, 100E, 100F, 100G, 100H are the candidate devices.

MFP 100C is present at a distance of 1 m from the current position of the user. Four MFPs 100E, 100F, 100G, 100H are present at a distance of 40 m from the current position of the user.

FIG. 18 is a diagram showing an example of usability information at the second time. The usability information shown in FIG. 18 appears on display unit 206 of portable information device 200 carried by the user at the second time. Referring to FIG. 18, the usability information includes the usability information for MFP 100C located 1 m away from the user, "MFPB 1 m ahead takes 5 minutes to complete a print job." "MFPB" is the name given to MFP 100C. The usability information for MFP 100C is the first level and includes the completion time.

The usability information also includes the usability information for MFP 100C, "Paper will run out after 50 sheets. Prepare a refill." "MFPB" is the name given to MFP 100C. The usability information "Paper will run out after 50 sheets. Prepare a refill." is trouble information for MFP 100C and is a message to give a notice that a paper-out event will occur.

The usability information further includes the usability information for MFPs 100E to 100H located 50 m away from the user, "Four MFPs are available 50 m ahead." The usability information for MFPs 100E to 100H is the second level.

Figure 19:
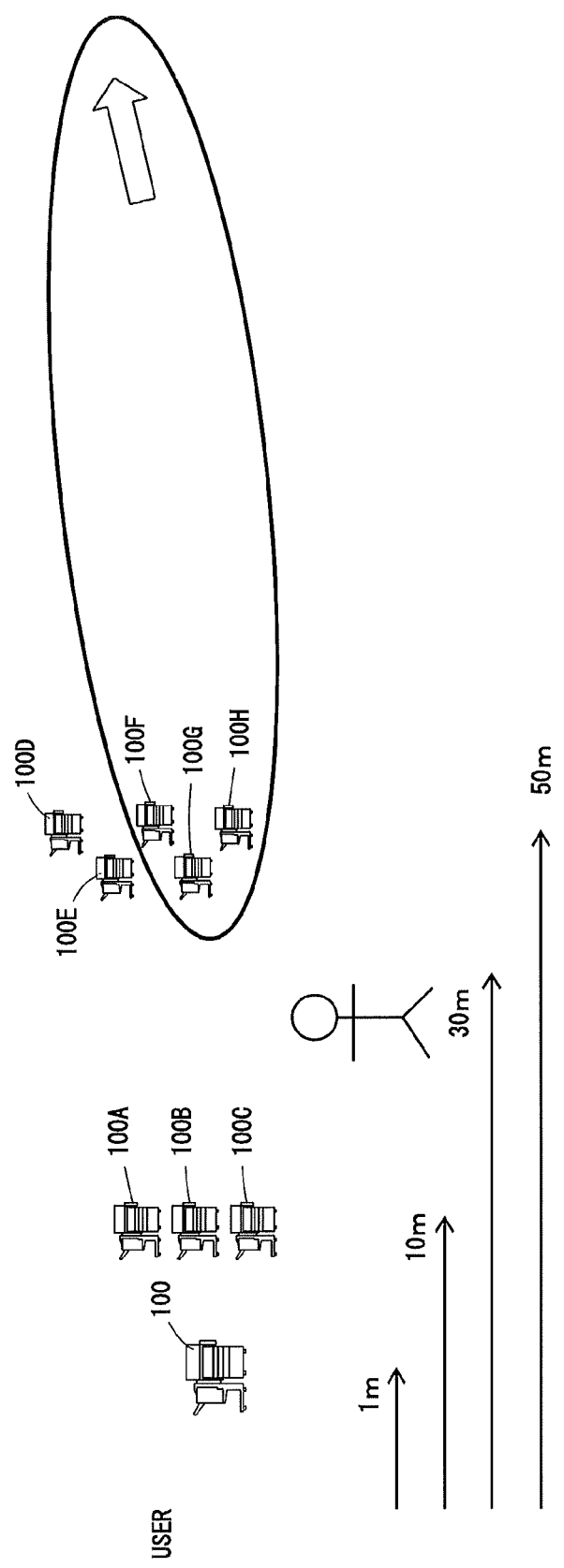
FIG. 19 is a diagram showing an example of the positional relationship between candidate devices and a user at a third time.

FIG. 19 is a diagram showing an example of the positional relationship between candidate devices and a user at a third time. FIG. 19 shows the positional relationship between the candidate devices and the user at the third time while the user is moving in the arrow direction in the figure. The third time is the time when the user has moved 20 m in the moving direction since the second time. Referring to FIG. 19, MFPs 100F, 100G, 100H out of the nine MFPs 100, 100A to 100H included in print system 1 are present in a predetermined range from the moving direction of the user. Accordingly, three MFPs 100F, 100G, 100H are candidate devices. MFPs 100F, 100G, 100H are present at a distance of 20 m from the current position of the user.

FIG. 20 is a diagram showing an example of usability information at the third time. The usability information shown in FIG. 20 appears on display unit 206 of portable information device 200 carried by the user at the third time. Referring to FIG. 20, the usability information includes the usability information for MFPs 100F, 100G, 100H located 20 m away from the user, "Three MFPs are available 20 m ahead." The usability information for MFPs 100F to 100H is the second level.

First Modification

In print system 1 in the foregoing embodiment, usability information is generated in portable information device 200 and displayed. A print system 1A in a first modification differs in that usability information is generated in server 300. For print system 1A in the first modification, the difference from the forgoing print system 1 will be mainly described below.

In the first modification, PC 400 transmits print status information to server 300. More specifically, in the first modification, the functions of CPU 401 of PC 400 differ from the functions shown in FIG. 7 in print status information transmission portion 461. Print status information transmission portion 461 of CPU 401 of PC 400 in the first modification transmits a set of the user identification information of the authenticated user and the print status information to server 300 through communication unit 405.

FIG. 21 is a block diagram showing an example of functions of the CPU of the server in the first modification. Referring to FIG. 21, the functions of CPU 301A of server 300 in the first modification differs from the functions of CPU 301 of server 300 shown in FIG. 8 in that a print status information reception portion 371, a portable information device specifying portion 373, a usability information generation portion 253A, and a usability information transmission portion 375 are added. The other functions are the same as the functions of CPU 301 of server 300 shown in FIG. 8. A description therefore will not be repeated here.

Referring to FIG. 21, print status information reception portion 371 controls communication unit 305 to receive a set of the user identification information and the print status information transmitted by PC 400. In response to a set of the user identification information and the print status information being received from PC 400, print status information reception portion 371 outputs the print status information to usability information generation portion 253A and outputs the user identification information to portable information device specifying portion 373.

In response to input of the user identification information from print status information reception portion 371, portable information device specifying portion 373 specifies portable information device 200 allocated to the user specified by the user identification information. Server 300 stores user data in advance in which the user identification information is associated with the device identification information for identifying portable information device 200 allocated to that user. Portable information device 200 is specified based on the user data. Portable information device specifying portion 373 outputs the device identification information to usability information generation portion 253A.

The user data may be stored in PC 400, so that the portable information device allocated to the user specified by the user identification information may be specified in PC 400. A set of the device identification information for identifying portable information device 200 and the print status information may be received from PC 400.

Usability information generation portion 253A has the same functions as the usability information generation portion 253 shown in FIG. 11, excluding the device position acquisition portion 261. Device position acquisition portion 261 of usability information generation portion 253 in the first modification acquires, from portable information device 200, the position information of portable information device 200 specified by the device identification information input from portable information device specifying portion 373. The position information of portable information device 200 is acquired by requesting portable information device 200 to transmit the position information and receiving the position information sent back from portable information device 200.

Usability information transmission portion 375 transmits the usability information generated by usability information generation portion 253A to portable information device 200 specified by portable information device specifying portion 373, through communication unit 305.

FIG. 22 is a block diagram showing an example of functions of the CPU of the portable information device in the first modification. Referring to FIG. 22, the functions of CPU 201A of portable information device 200 in the first modification differs from the functions of CPU 201 of portable information device 200 shown in FIG. 10 in that print status information reception portion 251 and usability information generation portion 253 are deleted and in that a usability information reception portion 291 and a device position transmission portion 293 are added. The other functions are the same as the functions shown in FIG. 10 and therefore a description will not be repeated here.

Usability information reception portion 291 controls wireless LAN I/F 208 to receive usability information transmitted by server 300. In response to the usability information being received from server 300, usability information reception portion 291 outputs the usability information to usability information output portion 255.

When wireless LAN I/F 208 receives a signal for requesting transmission of the position information from server 300, device position transmission portion 293 transmits the position information to server 300 to indicate the position detected by device position detection portion 257.

Second Modification

In the foregoing print system 1, usability information is generated in portable information device 200 and displayed. A print system 1B in a second modification differs in that usability information is generated in any one of MFPs 100, 100A to 100H. Here, MFP 100 generates usability information, by way of example. For print system 1B in the second modification, the difference from the foregoing print system 1 will be mainly described.

In the second modification, PC 400 transmits print status information to MFP 100. More specifically, in the second modification, the functions of CPU 401 of PC 400 differ from the functions shown in FIG. 7 in print status information transmission portion 461. Print status information transmission portion 461 of CPU 401 of PC 400 in the second modification transmits a set of the user identification information of the authenticated user and the print status information to MFP 100 through communication unit 405.

Figure 23:
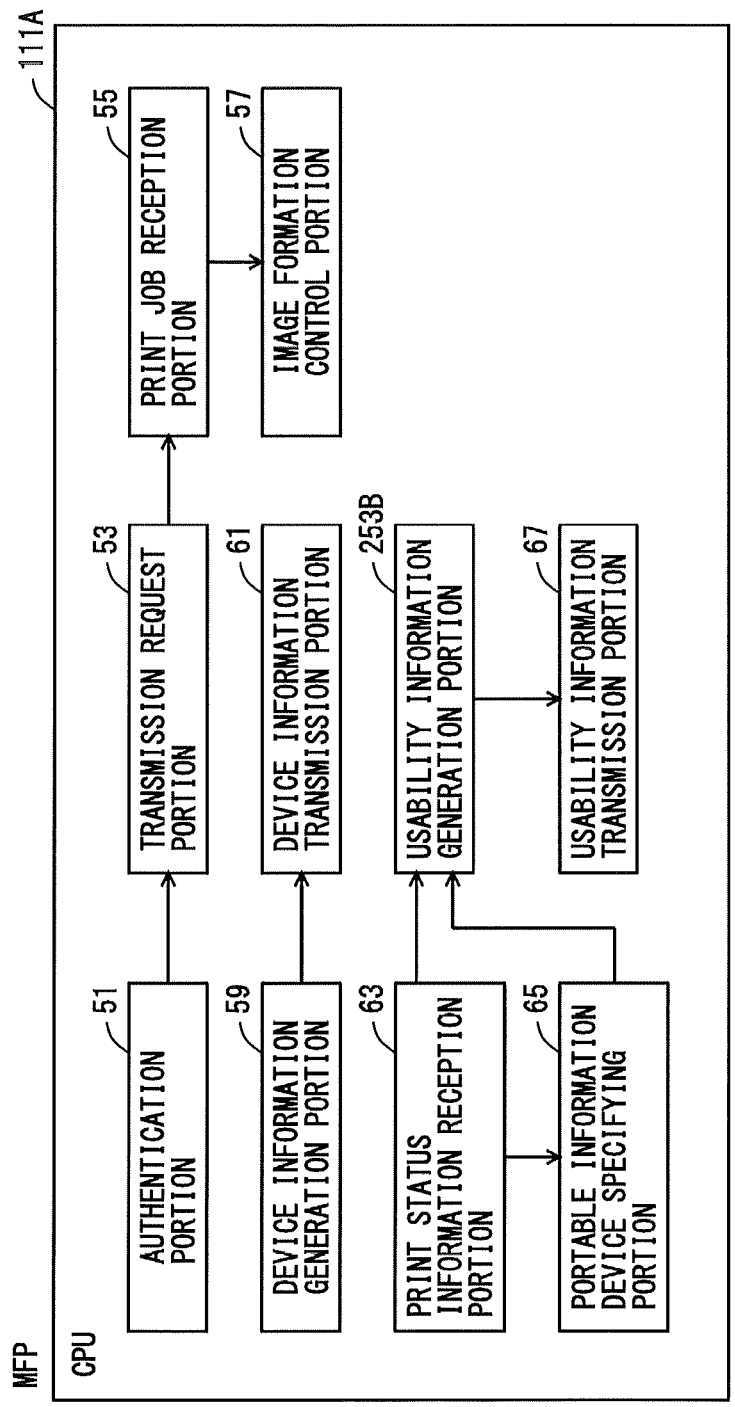
FIG. 23 is a block diagram showing an example of functions of the CPU of the MFP in a second modification.

FIG. 23 is a block diagram showing an example of functions of the CPU of the MFP in the second modification. Referring to FIG. 23, the functions of CPU 111A of MFP 100 in the second modification differ from the functions of CPU 111 of MFP 100 shown in FIG. 9 in that a print status information reception portion 63, a portable information device specifying portion 65, a usability information generation portion 253B, and a usability information transmission portion 67 are added. The other functions are the same as the functions of CPU 111 of MFP 100 shown in FIG. 9. A description therefore will not be repeated here.

Referring to FIG. 23, print status information reception portion 63 controls communication I/F unit 112 to receive a set of the user identification information and the print status information transmitted by PC 400. In response to a set of the user identification information and the print status information being received from PC 400, print status information reception portion 63 outputs the print status information to usability information generation portion 253B and outputs the user identification information to portable information device specifying portion 65.

In response to input of the user identification information from print status information reception portion 63, portable information device specifying portion 65 specifies portable information device 200 allocated to the user specified by the user identification information. MFP 100 stores user data in advance in which the user identification information is associated with the device identification information for identifying portable information device 200 allocated to that user. Portable information device 200 is specified based on the user data. Portable information device specifying portion 65 outputs the device identification information to usability information generation portion 253B.

The user data may be stored in PC 400, so that the potable information device allocated to the user specified by the user identification information is specified in PC 400. A set of the device identification information for identifying portable information device 200 and the print status information may be received from PC 400.

Usability information generation portion 253B has the same functions as usability information generation portion 253 shown in FIG. 11, excluding device position acquisition portion 261. Device position acquisition portion 261 of usability information generation portion 253B in the second modification acquires, from portable information device 200, the position information of portable information device 200 specified by the device identification information input from portable information device specifying portion 65. The position information of portable information device 200 is acquired by requesting portable information device 200 to transmit the position information and receiving the position information sent back from portable information device 200.

Usability information transmission portion 67 transmits the usability information generated by usability information generation portion 253B to portable information device 200 specified by portable information device specifying portion 65 through communication I/F unit 112.

The functions of the CPU of the potable information device in the second modification differ from the functions shown in FIG. 22 only in usability information reception portion 291 and device position transmission portion 293, and the other functions are the same. Specifically, usability information reception portion 291 controls wireless LAN I/F 208 to receive the usability information transmitted by MFP 100. In response to the usability information being received from MFP 100, usability information reception portion 291 outputs the usability information to usability information output portion 255.

When wireless LAN I/F 208 receives a signal for requesting transmission of the position information from MFP 100, device position transmission portion 293 transmits the position information to MFP 100 to indicate the position detected by device position detection portion 257.

As described above, in print system 1 in the present embodiment, any one of portable information device 200, server 300, MFPs 100, 100A to 100H functions as a usability information generation device. The usability information generation device then generates usability information indicating a state in which a print job is to be executed in each of MFPs 100, 100A to 100H, based on the device information generated by each of MFPs 100, 100A to 100H and the print status information generated by PC 400. Portable information device 200 outputs the generated usability information. When a print job is specified in PC 400, usability information is generated to indicate a state in which the print job is to be executed in each of MFPs 100, 100A to 100H. The usability information is output by portable information device 200, so that the user can easily select the device to execute the print job, from among MFPs 100, 100A to 100H.

The time when execution of the print job will be finished is output as the usability information. The user is thereby notified of which of MFPs 100, 100A to 100H will finish the job earlier.

The usability information also includes trouble information. The user is thereby notified of which of MFPs 100, 100A to 100H will have a trouble such as paper out.

One or more candidate devices are decided from among MFPs 100, 100A to 100H, based on the position where each of MFPs 100, 100A to 100H is arranged and the position of portable information device 200. The usability information is generated corresponding to each of the one or more candidate devices. Accordingly, candidate devices are decided based on the relative position between the user and MFPs 100, 100A to 100H, so that the usability information of only the device that is likely to be used by the user is output.

A device present in a predetermined range from the moving direction of portable information device 200 is decided as a candidate device from among MFPs 100, 100A to 100H, so that the usability information of only the device that is likely to be used by the user is output.

The usability information in different levels is generated depending on the distances between portable information device 200 and the candidate devices, so that the information provided can be varied depending on the distances from the user.

The timing for outputting the usability information is decided as the first output timing, the second output timing, or the third output timing, so that the usability information can be output efficiently. The first output timing, the second output timing, and the third output timing may be used alone or in combination of two or more.

Although print system 1 has been described in the embodiment above, it is needless to say that the present invention can be understood as a usability information generation method for allowing any one of portable information device 200, server 300, MFPs 100, 100A to 100H to execute the print assistance process shown in FIG. 19, and a usability information generation program for allowing the CPU of any one of portable information device 200, server 300, MFPs 100, 100A to 100H to execute the usability information generation method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A print system comprising a server, an information processing apparatus, one or more image forming apparatuses, and a portable information device,
the information processing apparatus including a hardware processor configured to:
determine an operating user,
transmit a print job including user identification information for identifying the operating user, print data to be subjected to image formation, and a condition for forming an image of the print data, to the server in response to an instruction by the operating user, and
generate print status information including the user identification information and the print condition included in the print job, in response to transmission of the print job;
each of the one or more image forming apparatuses including a hardware processor configured to:
authenticate a user,
in response to a user being authenticated, transmit a transmission request including user identification information for identifying the authenticated user, to the server,
form an image of print data included in a print job received from the server, based on the print job, in response to transmission of the transmission request, and
generate device information including state information indicating an operating state of the image forming apparatus itself;
the server including a hardware processor configured to:
store the print job in response to the print job being received, and
in response to a transmission request being received from any one of the image forming apparatuses, transmit a print job to the image forming apparatus that has transmitted the transmission request among the one or more image forming apparatuses, if a print job that includes the same user identification information as the user identification information included in the transmission request is stored;
the portable information device including a hardware processor configured to:
output generated usability information, and
detect a position of the portable information device;
wherein one of the server, the one or more image forming apparatuses, and the portable information device is a usability information generation device,
the hardware processor of the usability information generation device further configured to:
generate usability information, the usability information indicating the usability of each of the one or more image forming apparatuses, in which the print job is to be executed, based on the device information generated by each of the one or more image forming apparatuses and the print status information generated by the information processing apparatus,
decide one or more candidate devices from among the one or more image forming apparatuses, based on a position where each of the one or more image forming apparatuses is arranged and the detected position of the portable information device, and generate usability information corresponding to each of the decided one or more candidate devices, and the usability information has a greater amount of information as a distance between the portable information device and the candidate device reduces.

2. The print system according to claim 1, wherein the hardware processor of the usability information generation device is further configured to calculate a time taken for each of the one or more image forming apparatuses to complete execution of the print job.

3. The print system according to claim 1, wherein the hardware processor of the usability information generation device is further configured to predict a trouble that will occur when each of the one or more image forming apparatuses executes the print job.

4. A print system comprising a server, an information processing apparatus, one or more image forming apparatuses, and a portable information device,
the information processing apparatus including a hardware processor configured to:
determine an operating user,
transmit a print job including user identification information for identifying the operating user, print data to be subjected to image formation, and a condition for forming an image of the print data, to the server in response to an instruction by the operating user, and
generate print status information including the user identification information and the print condition included in the print job, in response to transmission of the print job;
each of the one or more image forming apparatuses including a hardware processor configured to:
authenticate a user,
in response to a user being authenticated, transmit a transmission request including user identification information for identifying the authenticated user, to the server,
form an image of print data included in a print job received from the server, based on the print job, in response to transmission of the transmission request, and
generate device information including state information indicating an operating state of the image forming apparatus itself;
the server including a hardware processor configured to:
store the print job in response to the print job being received, and
in response to a transmission request being received from any one of the image forming apparatuses, transmit a print job to the image forming apparatus that has transmitted the transmission request among the one or more image forming apparatuses, if a print job that includes the same user identification information as the user identification information included in the transmission request is stored;
the portable information device including a hardware processor configured to:
output generated usability information, and
detect a position of the portable information device;
wherein one of the server, the one or more image forming apparatuses, and the portable information device is a usability information generation device,
the hardware processor of the usability information generation device further configured to:
generate usability information, the usability information indicating the usability of each of the one or more image forming apparatuses, in which the print job is to be executed, based on the device information generated by each of the one or more image forming apparatuses and the print status information generated by the information processing apparatus, decide one or more candidate devices from among the one or more image forming apparatuses, based on a position where each of the one or more image forming apparatuses is arranged and the detected position of the portable information device, generate usability information corresponding to each of the decided one or more candidate devices, detect a moving direction of the portable information device, based on a temporal change in the detected position of the portable information device, and decide a device present in a predetermined range from the detected moving direction, as the candidate device, from among the one or more image forming apparatuses.

5. The print system according to claim 4, wherein the hardware processor of the usability information generation device is further configured to decide a timing for outputting the usability information, based on the number of the decided one or more candidate devices.

6. The print system according to claim 5, wherein the hardware processor of the usability information generation device is further configured to decide the timing for outputting the usability information, in response to a predetermined operation being input by a user operating the portable information device.

7. The print system according to claim 5, wherein the hardware processor of the usability information generation device is further configured to decide the timing for outputting the usability information after the portable information device moves a predetermined distance after the print job is transmitted to the server.

8. The print system according to claim 4, wherein the hardware processor of the usability information generation device is further configured to calculate a time taken for each of the one or more image forming apparatuses to complete execution of the print job.

9. The print system according to claim 4, wherein the hardware processor of the usability information generation device is further configured to predict a trouble that will occur when each of the one or more image forming apparatuses executes the print job.

10. A print system comprising a server, an information processing apparatus, one or more image forming apparatuses, and a portable information device,
the information processing apparatus including a hardware processor configured to:
determine an operating user,
transmit a print job including user identification information for identifying the operating user, print data to be subjected to image formation, and a condition for forming an image of the print data, to the server in response to an instruction by the operating user, and
generate print status information including the user identification information and the print condition included in the print job, in response to transmission of the print job;

each of the one or more image forming apparatuses including a hardware processor configured to:
  authenticate a user,
  in response to a user being authenticated, transmit a transmission request including user identification information for identifying the authenticated user, to the server,
  form an image of print data included in a print job received from the server, based on the print job, in response to transmission of the transmission request, and
  generate device information including state information indicating an operating state of the image forming apparatus itself;
the server including a hardware processor configured to:
  store the print job in response to the print job being received, and
  in response to a transmission request being received from any one of the image forming apparatuses, transmit a print job to the image forming apparatus that has transmitted the transmission request among the one or more image forming apparatuses, if a print job that includes the same user identification information as the user identification information included in the transmission request is stored;
the portable information device including a hardware processor configured to:
  output generated usability information, and
  detect a position of the portable information device;
wherein one of the server, the one or more image forming apparatuses, and the portable information device is a usability information generation device,
the hardware processor of the usability information generation device further configured to:
  generate usability information, the usability information indicating the usability of each of the one or more image forming apparatuses, in which the print job is to be executed, based on the device information generated by each of the one or more image forming apparatuses and the print status information generated by the information processing apparatus,
  decide one or more candidate devices from among the one or more image forming apparatuses, based on a position where each of the one or more image forming apparatuses is arranged and the detected position of the portable information device,
  generate usability information corresponding to each of the decided one or more candidate devices, and
  generate usability information with a level varying with a distance between the portable information device and the candidate device.

11. The print system according to claim 10, wherein the hardware processor of the usability information generation device is further configured to calculate a time taken for each of the one or more image forming apparatuses to complete execution of the print job.

12. The print system according to claim 10, wherein the hardware processor of the usability information generation device is further configured to predict a trouble that will occur when each of the one or more image forming apparatuses executes the print job.

13. A usability information generation device for use in a print system in which a print job generated by an information processing apparatus is temporarily stored into a server and, in response to a user designating one of one or more image forming apparatuses, the designated image forming apparatus forms an image by downloading the print job from the server, the usability information generation device comprising:
  a hardware processor configured to:
    acquire print status information including user identification information and a print condition included in the print job from the information processing apparatus;
    acquire, from each of the one or more image forming apparatuses, device information including state information indicating an operating state of the image forming apparatus itself;
    generate usability information indicating the usability of each of the one or more image forming apparatuses, in which the print job is to be executed, based on the device information acquired from each of the one or more image forming apparatuses and the print status information acquired from the information processing apparatus;
    decide one or more candidate devices from among the one or more image forming apparatuses, based on a position where each of the one or more image forming apparatuses is arranged and a detected position of a portable information device;
    generate usability information corresponding to each of the decided one or more candidate devices;
    detect a moving direction of the portable information device, based on a temporal change in the detected position of the portable information device; and
    decide a device present in a predetermined range from the detected moving direction, as the candidate device, from among the one or more image forming apparatuses;
  wherein the print system comprises the server, the information processing apparatus, the one or more image forming apparatuses, and the portable information device;
  the information processing apparatus includes a hardware processor configured to:
    determine an operating user,
    transmit a print job including user identification information for identifying the operating user, print data to be subjected to image formation, and a condition for forming an image of the print data, to the server in response to an instruction by the operating user, and
    generate print status information including the user identification information and the print condition included in the print job, in response to transmission of the print job;
  each of the one or more image forming apparatuses includes a hardware processor configured to:
    authenticate a user,
    in response to a user being authenticated, transmit a transmission request including user identification information for identifying the authenticated user, to the server,
    form an image of print data included in a print job received from the server, based on the print job, in response to transmission of the transmission request, and
    generate device information including state information indicating an operating state of the image forming apparatus itself;
  the server includes a hardware processor configured to:
    store the print job in response to the print job being received, and in response to a transmission request being received from any one of the image forming apparatuses, transmit a print job to the image forming apparatus that has transmitted the transmission request among the one or more image forming apparatuses, if a print job that includes the same user identification information as the user identification information included in the transmission request is stored;

the portable information device includes a hardware processor configured to:

output generated usability information, and detect a position of the portable information device;

wherein one of the server, the one or more image forming apparatuses, and the portable information device is the usability information generation device.

14. A non-transitory computer-readable recording medium encoded with a usability information generation program performed by a computer controlling a usability information generation device for use in a print system in which a print job generated by an information processing apparatus is temporarily stored into a server and, in response to a user designating one of one or more image forming apparatuses, the designated image forming apparatus forms an image by downloading the print job from the server, the program causing the computer to perform processing comprising:

determining an operating user;

transmitting a print job including user identification information for identifying the operating user, print data to be subjected to image formation, and a condition for forming an image of the print data, to the server in response to an instruction by the operating user;

generating print status information including the user identification information and the print condition included in the print job, in response to transmission of the print job;

authenticating a user;

in response to authenticating the user, transmitting a transmission request including user identification information for identifying the authenticated user, to the server;

forming an image of print data included in a print job received from the server;

generating device information including state information indicating an operating state of the image forming apparatus itself;

storing the print job in response to the print job being received;

in response to a transmission request being received from any one of the image forming apparatuses, transmitting a print job to the image forming apparatus that has transmitted the transmission request among the one or more image forming apparatuses, if a print job that includes the same user identification information as the user identification information included in the transmission request is stored;

outputting generated usability information;

detecting a position of a portable information device;

acquiring the print status information including user identification information and the print condition included in the print job from the information processing apparatus;

acquiring, from each of the one or more image forming apparatuses, the device information including state information indicating the operating state of the image forming apparatus itself;

generating usability information indicating the usability of each of the one or more image forming apparatuses, in which the print job is to be executed, based on the device information acquired from each of the one or more image forming apparatuses and the print status information acquired from the information processing apparatus;

deciding one or more candidate devices from among the one or more image forming apparatuses, based on a position where each of the one or more image forming apparatuses is arranged and the detected position of the portable information device;

generating usability information corresponding to each of the decided one or more candidate devices;

detecting a moving direction of the portable information device, based on a temporal change in the detected position of the portable information device; and deciding a device present in a predetermined range from the detected moving direction, as the candidate device, from among the one or more image forming apparatuses.

15. A usability information generation device for use in a print system in which a print job generated by an information processing apparatus is temporarily stored into a server and, in response to a user designating one of one or more image forming apparatuses, the designated image forming apparatus forms an image by downloading the print job from the server, the usability information generation device comprising:

a hardware processor configured to:

acquire print status information including user identification information and a print condition included in the print job from the information processing apparatus;

acquire, from each of the one or more image forming apparatuses, device information including state information indicating an operating state of the image forming apparatus itself;

generate usability information indicating the usability of each of the one or more image forming apparatuses, in which the print job is to be executed, based on the device information acquired from each of the one or more image forming apparatuses and the print status information acquired from the information processing apparatus;

decide one or more candidate devices from among the one or more image forming apparatuses, based on a position where each of the one or more image forming apparatuses is arranged and a detected position of a portable information device;

generate usability information corresponding to each of the decided one or more candidate devices, the usability information having a greater amount of information as a distance between the portable information device and the candidate device reduces;

wherein the print system comprises the server, the information processing apparatus, the one or more image forming apparatuses, and the portable information device;

the information processing apparatus including a hardware processor configured to:

determine an operating user, transmit a print job including user identification information for identifying the operating user, print data to be subjected to image formation, and a condition for forming an image of the print data, to the server in response to an instruction by the operating user, and generate print status information including the user identification information and the print condition included in the print job, in response to transmission of the print job;

each of the one or more image forming apparatuses including a hardware processor configured to:

authenticate a user, in response to a user being authenticated, transmit a transmission request including user identification information for identifying the authenticated user, to the server, form an image of print data included in a print job received from the server, based on the print job, in response to transmission of the transmission request, and generate device information including state information indicating an operating state of the image forming apparatus itself;

the server including a hardware processor configured to:

store the print job in response to the print job being received, and in response to a transmission request being received from any one of the image forming apparatuses, transmit a print job to the image forming apparatus that has transmitted the transmission request among the one or more image forming apparatuses, if a print job that includes the same user identification information as the user identification information included in the transmission request is stored;

the portable information device including a hardware processor configured to:

output generated usability information, and detect a position of the portable information device;

wherein one of the server, the one or more image forming apparatuses, and the portable information device is the usability information generation device.

16. A non-transitory computer-readable recording medium encoded with a usability information generation program performed by a computer controlling a usability information generation device for use in a print system in which a print job generated by an information processing apparatus is temporarily stored into a server and, in response to a user designating one of one or more image forming apparatuses, the designated image forming apparatus forms an image by downloading the print job from the server, the program causing the computer to perform processing comprising:

determining an operating user;

transmitting a print job including user identification information for identifying the operating user, print data to be subjected to image formation, and a condition for forming an image of the print data, to the server in response to an instruction by the operating user;

generating print status information including the user identification information and the print condition included in the print job, in response to transmission of the print job;

authenticating a user;

in response to authenticating the user, transmitting a transmission request including user identification information for identifying the authenticated user, to the server;

forming an image of print data included in a print job received from the server;

generating device information including state information indicating an operating state of the image forming apparatus itself;

storing the print job in response to the print job being received;

in response to a transmission request being received from any one of the image forming apparatuses, transmitting a print job to the image forming apparatus that has transmitted the transmission request among the one or more image forming apparatuses, if a print job that includes the same user identification information as the user identification information included in the transmission request is stored;

outputting generated usability information;

detecting a position of a portable information device;

acquiring the print status information including user identification information and the print condition included in the print job from the information processing apparatus;

acquiring, from each of the one or more image forming apparatuses, the device information including state information indicating the operating state of the image forming apparatus itself;

generating usability information indicating the usability of each of the one or more image forming apparatuses, in which the print job is to be executed, based on the device information acquired from each of the one or more image forming apparatuses and the print status information acquired from the information processing apparatus;

deciding one or more candidate devices from among the one or more image forming apparatuses, based on a position where each of the one or more image forming apparatuses is arranged and the detected position of the portable information device; and generating usability information corresponding to each of the decided one or more candidate devices, the usability information having a greater amount of information as a distance between the portable information device and the candidate device reduces.

17. A usability information generation device for use in a print system in which a print job generated by an information processing apparatus is temporarily stored into a server and, in response to a user designating one of one or more image forming apparatuses, the designated image forming apparatus forms an image by downloading the print job from the server, the usability information generation device comprising:

a hardware processor configured to:

acquire print status information including user identification information and a print condition included in the print job from the information processing apparatus;

acquire, from each of the one or more image forming apparatuses, device information including state information indicating an operating state of the image forming apparatus itself;

generate usability information indicating the usability of each of the one or more image forming apparatuses, in which the print job is to be executed, based on the device information acquired from each of the one or more image forming apparatuses and the print status information acquired from the information processing apparatus;

decide one or more candidate devices from among the one or more image forming apparatuses, based on a position where each of the one or more image forming apparatuses is arranged and a detected position of a portable information device;

generate usability information corresponding to each of the decided one or more candidate devices; and generate usability information with a level varying with a distance between the portable information device and the candidate device;

wherein the print system comprises the server, the information processing apparatus, the one or more image forming apparatuses, and the portable information device;

the information processing apparatus including a hardware processor configured to:

determine an operating user, transmit a print job including user identification information for identifying the operating user, print data to be subjected to image formation, and a condition for forming an image of the print data, to the server in response to an instruction by the operating user, and generate print status information including the user identification information and the print condition included in the print job, in response to transmission of the print job;

each of the one or more image forming apparatuses including a hardware processor configured to:

authenticate a user, in response to a user being authenticated, transmit a transmission request including user identification information for identifying the authenticated user, to the server, form an image of print data included in a print job received from the server, based on the print job, in response to transmission of the transmission request, and generate device information including state information indicating an operating state of the image forming apparatus itself;

the server including a hardware processor configured to:

store the print job in response to the print job being received, and in response to a transmission request being received from any one of the image forming apparatuses, transmit a print job to the image forming apparatus that has transmitted the transmission request among the one or more image forming apparatuses, if a print job that includes the same user identification information as the user identification information included in the transmission request is stored;

the portable information device including a hardware processor configured to:

output generated usability information, and detect a position of the portable information device;

wherein one of the server, the one or more image forming apparatuses, and the portable information device is the usability information generation device.

18. A non-transitory computer-readable recording medium encoded with a usability information generation program performed by a computer controlling a usability information generation device for use in a print system in which a print job generated by an information processing apparatus is temporarily stored into a server and, in response to a user designating one of one or more image forming apparatuses, the designated image forming apparatus forms an image by downloading the print job from the server, the program causing the computer to perform processing comprising:

determining an operating user;

transmitting a print job including user identification information for identifying the operating user, print data to be subjected to image formation, and a condition for forming an image of the print data, to the server in response to an instruction by the operating user;

generating print status information including the user identification information and the print condition included in the print job, in response to transmission of the print job;

authenticating a user;

in response to authenticating the user, transmitting a transmission request including user identification information for identifying the authenticated user, to the server;

forming an image of print data included in a print job received from the server;

generating device information including state information indicating an operating state of the image forming apparatus itself;

storing the print job in response to the print job being received;

in response to a transmission request being received from any one of the image forming apparatuses, transmitting a print job to the image forming apparatus that has transmitted the transmission request among the one or more image forming apparatuses, if a print job that includes the same user identification information as the user identification information included in the transmission request is stored;

outputting generated usability information;

detecting a position of a portable information device;

acquiring the print status information including user identification information and the print condition included in the print job from the information processing apparatus;

acquiring, from each of the one or more image forming apparatuses, the device information including state information indicating the operating state of the image forming apparatus itself;

generating usability information indicating the usability of each of the one or more image forming apparatuses, in which the print job is to be executed, based on the device information acquired from each of the one or more image forming apparatuses and the print status information acquired from the information processing apparatus;

deciding one or more candidate devices from among the one or more image forming apparatuses, based on a position where each of the one or more image forming apparatuses is arranged and the detected position of the portable information device;

generating usability information corresponding to each of the decided one or more candidate devices; and generating usability information with a level varying with a distance between the portable information device and the candidate device.

* * * * *